United States Patent
Ellanti et al.

(10) Patent No.: US 8,666,436 B2
(45) Date of Patent: *Mar. 4, 2014

(54) LOCATION BASED SYSTEM WITH CONTEXTUAL LOCATOR AND METHOD OF OPERATION THEREOF

(71) Applicant: TeleNav, Inc., Sunnyvale, CA (US)

(72) Inventors: Manohar Ellanti, Fremont, CA (US); HaiPing Jin, San Jose, CA (US); Shawn Timothy Carolan, Los Altos, CA (US)

(73) Assignee: Telenav, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/648,222

(22) Filed: Oct. 9, 2012

(65) Prior Publication Data

US 201Related U.S. Application Data

(63) Continuation of application No. 12/880,096, filed on Sep. 11, 2010, now Pat. No. 8,412,166.

(51) Int. Cl.
*H04W 24/00* (2009.01)

(52) U.S. Cl.
USPC ............ 455/457; 455/404.2; 455/456.3; 455/414.2; 707/999.003; 701/517; 701/533

(58) Field of Classification Search
USPC .......... 455/456, 403, 517, 561, 456.3, 456.1, 455/414.2, 428, 457; 370/338, 208, 345, 370/458, 328, 522, 350, 334; 375/260, 343, 375/144; 342/357, 457, 357.31; 340/539.13, 550, 426.19, 426.1, 8.1; 712/240; 701/533, 517; 707/999.003, 707/E17.108, 201, 517, 533
See application file for complete search history.

(56) References Cited

U.S. PATENT DOCUMENTS

| | | | |
|---|---|---|---|
| 5,508,940 A | 4/1996 | Rossmere et al. | |
| 5,827,946 A | 10/1998 | Klee et al. | |
| 6,269,369 B1 | 7/2001 | Robertson | |
| 6,421,709 B1 | 7/2002 | McCormick et al. | |
| 6,549,768 B1 * | 4/2003 | Fraccaroli | 455/456.3 |
| 6,618,593 B1 | 9/2003 | Drutman et al. | |
| 6,665,613 B2 | 12/2003 | Duvall | |
| 6,779,021 B1 | 8/2004 | Bates et al. | |
| 6,819,919 B1 * | 11/2004 | Tanaka | 455/414.1 |
| 6,867,733 B2 * | 3/2005 | Sandhu et al. | 342/357.34 |
| 6,883,000 B1 | 4/2005 | Gropper | |
| 7,071,842 B1 | 7/2006 | Brady, Jr. | |
| 7,155,484 B2 | 12/2006 | Malik | |
| 7,280,822 B2 | 10/2007 | Fraccaroli | |

(Continued)

OTHER PUBLICATIONS

Lunford, P. et al., "Because I Carry My Cell Phone Anyway: Functional Location-Based Reminder Applications", CHI 2006 Proceedings, Everyday Use of Mobiles, Apr. 22-27, 2006, pp. 889-898.

(Continued)

*Primary Examiner* — Mahendra Patel

(74) *Attorney, Agent, or Firm* — IP Investment Law Group

(57) ABSTRACT

A method of operation of a location based system includes: detecting an event representing a gathering of event participants; establishing a geofence associated with the event; and identifying a matching target from the event participants located within the geofence during the search time window for displaying on a device.

20 Claims, 8 Drawing Sheets

(56) References Cited

U.S. PATENT DOCUMENTS

| | | | |
|---|---|---|---|
| 7,286,929 B2 * | 10/2007 | Staton et al. | 701/467 |
| 7,323,982 B2 | 1/2008 | Staton et al. | |
| 7,327,250 B2 | 2/2008 | Harvey | |
| 7,327,258 B2 | 2/2008 | Fast et al. | |
| 7,366,919 B1 | 4/2008 | Sobel et al. | |
| 7,489,939 B2 | 2/2009 | Ashley et al. | |
| 7,493,211 B2 | 2/2009 | Breen | |
| 7,577,654 B2 | 8/2009 | Brants et al. | |
| 7,711,779 B2 | 5/2010 | Goodman et al. | |
| 7,848,765 B2 * | 12/2010 | Phillips et al. | 455/456.3 |
| 7,983,963 B2 * | 7/2011 | Byrne et al. | 705/27.2 |
| 8,325,025 B2 | 12/2012 | Morgan et al. | |
| 8,362,887 B2 | 1/2013 | Morgan et al. | |
| 2002/0018492 A1 | 2/2002 | Sakai et al. | |
| 2003/0105826 A1 | 6/2003 | Mayraz | |
| 2004/0176973 A1 | 9/2004 | Lapeze et al. | |
| 2005/0039177 A1 | 2/2005 | Burke | |
| 2005/0156715 A1 | 7/2005 | Zou et al. | |
| 2005/0159863 A1 | 7/2005 | Howard et al. | |
| 2005/0182722 A1 | 8/2005 | Meyer et al. | |
| 2005/0242971 A1 | 11/2005 | Dryer | |
| 2006/0007039 A1 | 1/2006 | Duvall | |
| 2006/0011721 A1 | 1/2006 | Olsen et al. | |
| 2006/0031464 A1 | 2/2006 | Bowman et al. | |
| 2006/0073857 A1 | 4/2006 | Hanabusa et al. | |
| 2006/0099969 A1 | 5/2006 | Staton et al. | |
| 2006/0099971 A1 | 5/2006 | Staton et al. | |
| 2006/0109107 A1 * | 5/2006 | Staton et al. | 340/539.13 |
| 2006/0181411 A1 | 8/2006 | Fast et al. | |
| 2006/0200305 A1 * | 9/2006 | Sheha et al. | 701/200 |
| 2006/0234727 A1 | 10/2006 | Ashley et al. | |
| 2006/0270421 A1 | 11/2006 | Phillips et al. | |
| 2007/0143300 A1 | 6/2007 | Gulli | |
| 2007/0185728 A1 | 8/2007 | Schwarz et al. | |
| 2007/0210936 A1 | 9/2007 | Nicholson | |
| 2007/0244977 A1 | 10/2007 | Atkins | |
| 2007/0296574 A1 * | 12/2007 | Smith et al. | 340/539.13 |
| 2008/0005071 A1 * | 1/2008 | Flake et al. | 707/3 |
| 2008/0052757 A1 | 2/2008 | Gulati et al. | |
| 2008/0086323 A1 | 4/2008 | Petrie et al. | |
| 2008/0086497 A1 | 4/2008 | Wallace et al. | |
| 2008/0129491 A1 | 6/2008 | Ruperto | |
| 2008/0143604 A1 | 6/2008 | Mock et al. | |
| 2008/0147812 A1 | 6/2008 | Curtis | |
| 2008/0167896 A1 | 7/2008 | Fast et al. | |
| 2008/0174485 A1 | 7/2008 | Carani et al. | |
| 2008/0183485 A1 | 7/2008 | Drabble et al. | |
| 2008/0238769 A1 | 10/2008 | Verechtchiagine | |
| 2008/0252487 A1 | 10/2008 | McClellan et al. | |
| 2008/0268869 A1 | 10/2008 | Lambda et al. | |
| 2008/0281518 A1 | 11/2008 | Dozier et al. | |
| 2008/0305779 A1 | 12/2008 | Wright et al. | |
| 2008/0305808 A1 | 12/2008 | Chan et al. | |
| 2009/0009321 A1 | 1/2009 | McClellan et al. | |
| 2009/0009357 A1 | 1/2009 | Heen et al. | |
| 2009/0017811 A1 | 1/2009 | Cole et al. | |
| 2009/0018929 A1 | 1/2009 | Weathers | |
| 2009/0027223 A1 | 1/2009 | Hill | |
| 2009/0037546 A1 | 2/2009 | Kirsch | |
| 2009/0082139 A1 | 3/2009 | Hart | |
| 2009/0093958 A1 | 4/2009 | Wang et al. | |
| 2009/0131080 A1 | 5/2009 | Nadler et al. | |
| 2009/0138336 A1 | 5/2009 | Ashley, Jr. et al. | |
| 2009/0140886 A1 | 6/2009 | Bender | |
| 2009/0233623 A1 * | 9/2009 | Johnson | 455/456.3 |
| 2010/0070758 A1 | 3/2010 | Low et al. | |
| 2010/0148947 A1 | 6/2010 | Morgan et al. | |
| 2010/0250682 A1 | 9/2010 | Goldberg et al. | |
| 2010/0262449 A1 * | 10/2010 | Monteforte et al. | 705/8 |
| 2011/0060796 A1 | 3/2011 | Grigsby et al. | |
| 2011/0066366 A1 | 3/2011 | Ellanti et al. | |
| 2011/0066690 A1 | 3/2011 | Ellanti et al. | |
| 2011/0070872 A1 | 3/2011 | Ellanti et al. | |
| 2013/0029696 A1 | 1/2013 | Ellanti et al. | |

OTHER PUBLICATIONS

Karimi, H. A. et al, "SoNAvNet: A Framework for Social Navigation Networks", Geoinformatics Laboratory, University of Pittsburgh, 2009, pp. 81-87.

* cited by examiner

LOCATION BASED SYSTEM WITH CONTEXTUAL LOCATOR AND METHOD OF OPERATION THEREOF

CROSS-REFERENCE TO RELATED APPLICATION

This is a continuation of co-pending U.S. patent application Ser. No. 12/880,096 filed Sep. 11, 2010.

TECHNICAL FIELD

The present invention relates generally to a location based system, and more particularly to a system for finding a person, entity, or thing.

BACKGROUND ART

Modern portable consumer and industrial electronics, especially client devices such as navigation systems, smart phones, portable digital assistants, and combination devices are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to find people, places, or things, such as a global positioning system for finding a locator or searching a map for finding a store.

Often, results are sought without considering relevant context or organization, which leaves the user inundated with useless results. Other times, the results are poorly organized and presented, which forces the user to spend more time and effort to make sense out of the presented results.

The need to reduce costs, improve efficiencies and performance, and meet competitive pressures adds an even greater urgency to the critical necessity for finding answers to these problems. However, solutions to these problems have been long sought but prior developments have not taught or suggested any solutions and, thus, solutions to these problems have long eluded those skilled in the art. Thus, a need still remains for a location based system with contextual locator mechanism.

DISCLOSURE OF THE INVENTION

The present invention provides a method of operation of a location based system including: detecting an event representing a gathering of event participants; establishing a geofence associated with the event; setting a search time window associated with the event; and identifying a matching target from the event participants located within the geofence during the search time window for displaying on a device.

The present invention provides a location based system, including: an event context module for detecting an event representing a gathering of event participants; a geofence module, coupled to the event context module, for establishing a geofence associated with the event; a context time module, coupled to the event context module, for setting a search time window associated with the event; and a filter module, coupled to the geofence module, for identifying a matching target from the event participants located within the geofence during the search time window for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
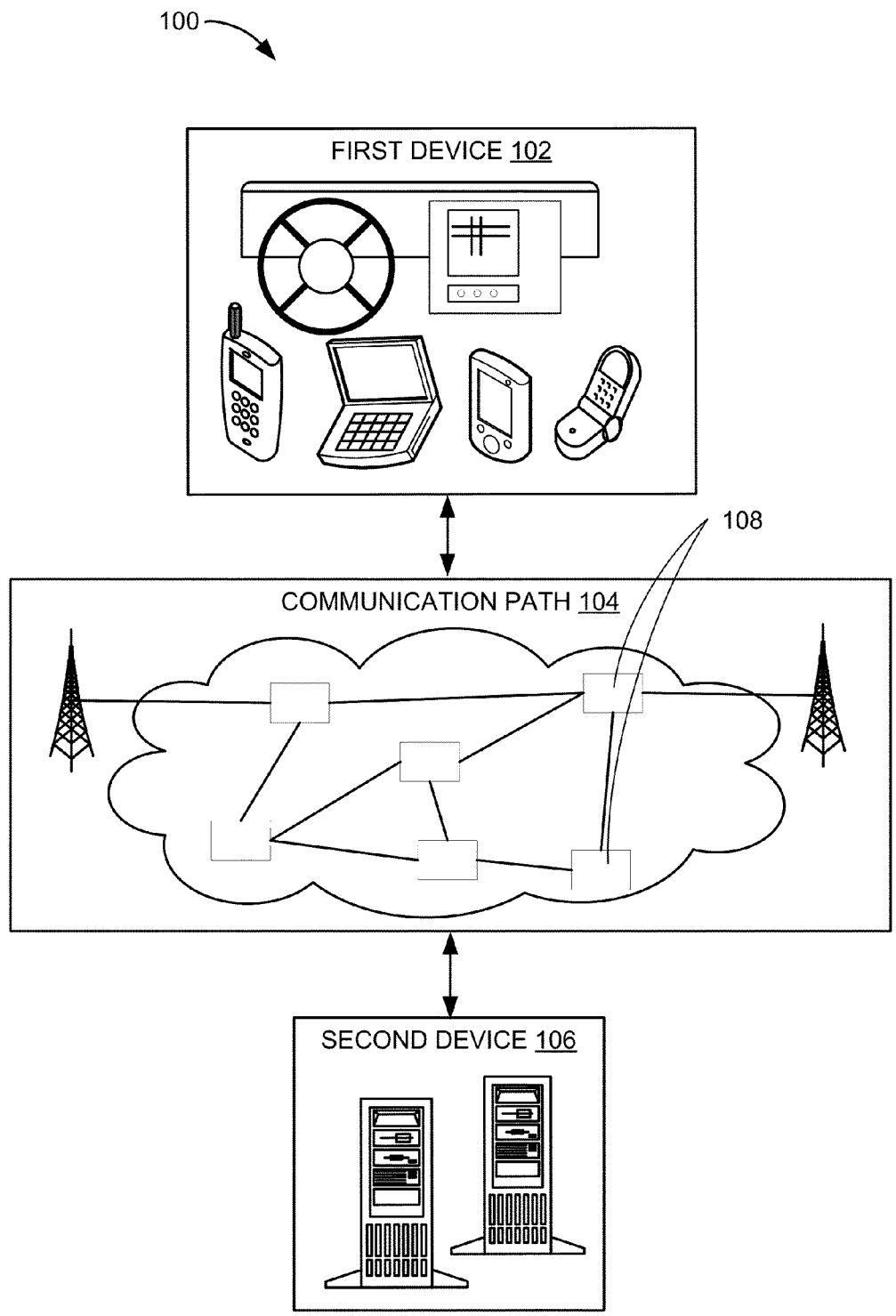
FIG. 1 is a location based system with contextual locator mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which location based information is expressed is not critical to some embodiments of the invention. For example, in some embodiments, location based information is presented in the format of, where X and Y are two ordinates that define the geographic location, i.e., a position of a user.

In an alternative embodiment, location based information is presented by longitude and latitude related information. In a further embodiment of the present invention, the location based information also includes a velocity element including a speed component and a heading component.

The term "relevant information" referred to herein comprises the location based information described as well as information relating to points of interest to the user, such as local business, hours of businesses, types of businesses, advertised specials, traffic information, maps, local events, and nearby community or personal information.

The term "module" referred to herein can include software, hardware, or a combination thereof For example, the software can be machine code, firmware, embedded code, and application software. Also for example, the hardware can be circuitry, processor, computer, integrated circuit, integrated circuit cores, a pressure sensor, an inertial sensor, a microelectromechanical system, passive devices, or a combination thereof.

Referring now to FIG. 1, therein is shown a location based system 100 with contextual locator mechanism in an embodiment of the present invention. The location based system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the location based system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10 Business Class mainframe or a HP ProLiant ML server. Yet another example, the second device 106 can be a particularized machine, such as a portable computing device, a thin client, a notebook, a netbook, a smartphone, personal digital assistant, or a cellular phone, and as specific examples, an Apple iPhone, Palm Centro, or Moto Q Global.

For illustrative purposes, the location based system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the location based system 100 is shown with the second device 106 and the first device 102 as end points of the communication path 104, although it is understood that the location based system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof Satellite communication, cellular communication, Bluetooth, Infrared Data Association standard, wireless fidelity, and worldwide interoperability for microwave access are examples of wireless communication that can be included in the communication path 104. Ethernet, digital subscriber line, fiber to the home, and plain old telephone service are examples of wired communication that can be included in the communication path 104.

Further, the communication path 104 can traverse a number of network topologies, including nodes 108, and distances. For example, the communication path 104 can include direct connection, personal area network, local area network, metropolitan area network, wide area network or any combination thereof.

Figure 2:
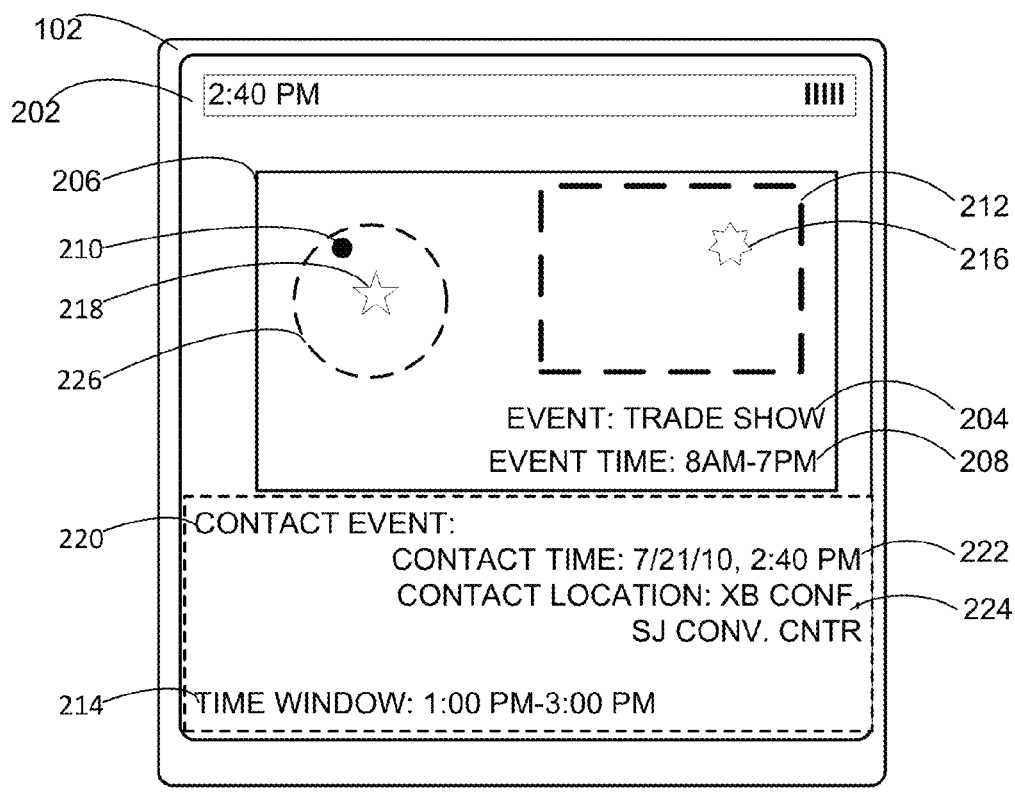
FIG. 2 is a first example of a display interface of the first device.

Referring now to FIG. 2, therein is shown a first example of a display interface 202 of the first device 102. The display interface 202 can show an event 204, an event location 206, an event time 208, an event participant 210, a geofence 212, a search time window 214, a matching target 216, a device location 218, a contact event 220, a contact time 222, a contact location 224, and a close contact boundary 226.

The event 204 is an occurrence or happening, or a social gathering at a given date or time. The event 204 can be represented by the purpose, title or name given to the occurrence, happening, or a social gathering. The event 204 can represent a specific event, such as birth of a baby or solar eclipse, or a social gathering, such as a birthday party or a trade show. The event 204 can also be the type of an event or the context for the event. For example, the event 204 can be the "Boston Marathon" or athletic contest, or the weekly staff meeting. The event 204 can have occurred in the past, is currently going on, or scheduled to be occurring in the future.

The event location 206 is the geographic location or region of the event 204. The event location 206 can be a geographic location, virtual location, or contact information such as a conference call number. For example, the event location 206 can be an address, set of cross streets, a famous landmark, or longitude and latitude coordinates. Also, for example, the event location 206 can be a web page, Net Meeting identifier, or a server address or name.

The event time 208 is the time period in which the event 204 has occurred, is occurring, or will be occurring. The event time 208 can be represented by the times at which the event 204 starts and ends, or by the time at which the event 204 starts and the length or duration of the event 204.

The location based system 100 can use the event 204, the event location 206, the event time 208 or combination thereof to search for and locate a desired person, place, entity, contact, thing, or combination thereof The detailed uses of the event 204, the event location 206, and the event time 208 will be discussed below.

The event participant 210 is a person, entity, or combination thereof that was, is, or will be part of the event 204. The event participant 210 can be a person or an entity that was, is, or is scheduled to be at the event location 206 during the event time 208. For example, the event participant 210 can be a company that was at the meeting last month or a vendor representative registered to be at Trade Show X tomorrow.

The geofence 212 is a geographic area for conducting a specific search. The geofence 212 can be a location based boundary for finding a person, place, entity, contact, or combination thereof. The geofence 212 can represent a location based boundary by enclosing a region with a continuous line, without any disconnects. For example, the geofence 212 can be country borders, building outline, zoning boundaries, conference boundaries, or portions thereof. The geofence 212 can also represent a location based boundary by selecting or highlighting a region, such a park or a room.

The search time window 214 is a window of time relevant to a specific search. The search time window 214 can be a span of time defining the time boundaries for conducting the search. The search time window 214 can be a period of time within one day, a block of days, across days, or a combination thereof. The search time window 214 can be a time period occurring in the past, present, future, or a combination thereof.

For example, the location based system 100 can look for a person who attended a certain meeting identified by or associated with the event 204 in the past or someone who will be attending a trade conference tomorrow. The search time window 214 can also be a combination of time periods so that the location based system 100 can only look for a company that had a booth both at a conference last month and the current trade show.

The location based system 100 can use the geofence 212, the search time window 214, or a combination thereof to search for and locate a desired person, place, entity, thing, or a combination thereof The detailed uses of the geofence 212 and the search time window 214 will be discussed below.

The matching target 216 is the person, entity, or a characteristic associated therewith, relative to the event 204 that is being sought. The matching target 216 can be the person, place, entity, thing, or a combination thereof that is being searched for. Alternatively, the matching target 216 can be something or someone that has certain characteristics. For example, if the location based system 100 is looking for someone at the airport that will be attending Trade Show A, the matching target 216 would be the event participant 210 to Trade Show A that is within the geofence 212 encircling the boundaries of the airport.

The device location 218 is a physical location of the first device 102 at a given time. The device location 218 can be represented by a visual representation in relation to surrounding entities or by location information. For example, the device location 218 can be represented by a visual mark overlaid on a map or by set of coordinates, such as GPS coordinate or longitude and latitude.

The contact event 220 is a record of an occasion where the user interfaced with the event participant 210. The contact event 220 can be an occasion where the user met, spoke with, physically touched, or was within a certain distance from the user.

The contact time 222 is a record of when the contact event 220 occurred. The contact location 224 can represent the geographic location where the contact event 220 occurred. For example, the contact location 224 can be the event location 206, the conference hall name within the event location 206, a description of the location, such as "near the water fountain," or an identifier, such as an address or a set of coordinates.

The close contact boundary 226 is a threshold distance for defining the contact event 220. The close contact boundary 226 is used to define the contact event 220 when geographic location of the event participant 210 is within the close contact boundary 226. The close contact boundary 226 can be a boundary encircling the device location 218.

Figure 3:
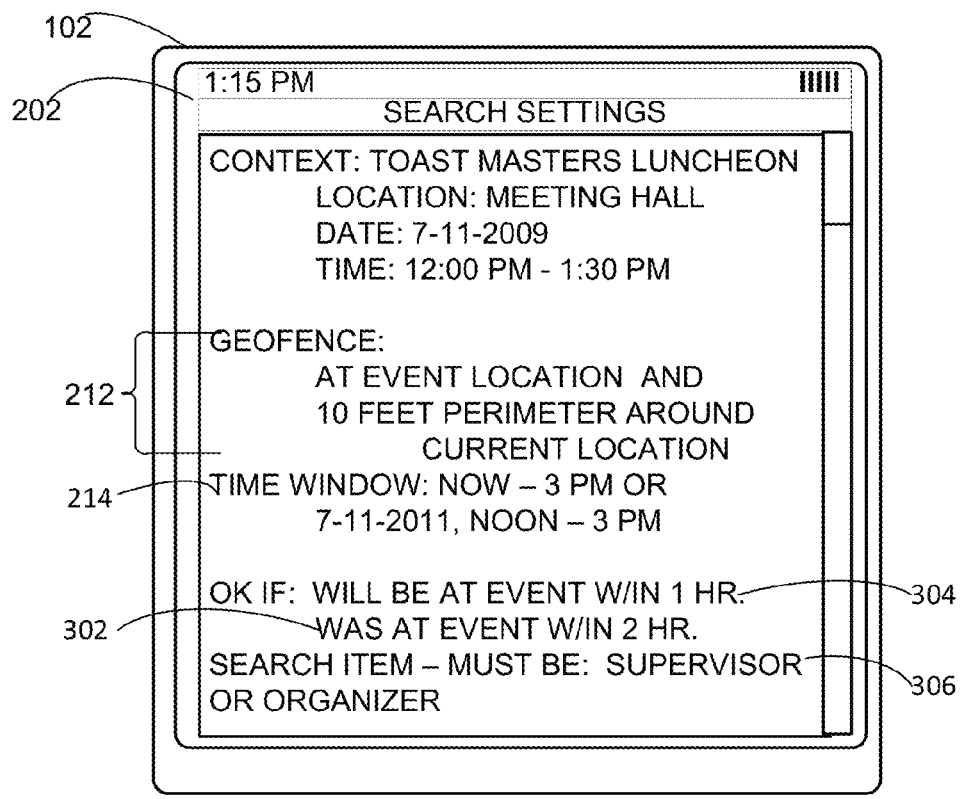
FIG. 3 is a second example of the display interface of the first device.

Referring now to FIG. 3, therein is shown a second example of the display interface 202 of the first device 102. The display interface 202 can show a past time period 302, a future time period 304, and a search item 306.

The past time period 302 is a period of time used to find the person or item sought that has moved out of the search area. The past time period 302 can be a time period that can be used to find the matching target 216 of FIG. 2 that was within the geofence 212 until a time period not exceeding the past time period 302.

For example, the past time period 302 can be set to 2 hours to find the matching target 216 that has moved out of the geofence 212 an hour ago to grab lunch. Also, for example, the past time period 302 can be set to a day to find an employee that may have not shown up to work, described by the geofence 212, due to an illness.

The future time period 304 is a period of time used to include finding the sought person or thing that will be in the search area shortly. The future time period 304 can be a time period that can be used to find the matching target 216 that is scheduled to be within the geofence 212 within a time period not exceeding the future time period 304. For example, the future time period 304 can be set to 15 minutes to find the matching target 216 that will be arriving at the conference center 5 minutes later than scheduled.

The search item 306 is a person, place, thing, or characteristic or type therewith that is desired in the matching target 216. The search item 306 can be the characteristic, such as job title or physical attribute, which the matching target 216 must have. For example, the search item 306 can be "organizer" if the location based system 100 is trying to find someone within the geofence 212 during the search time window 214 that also helped organize the event itself.

Figure 4:
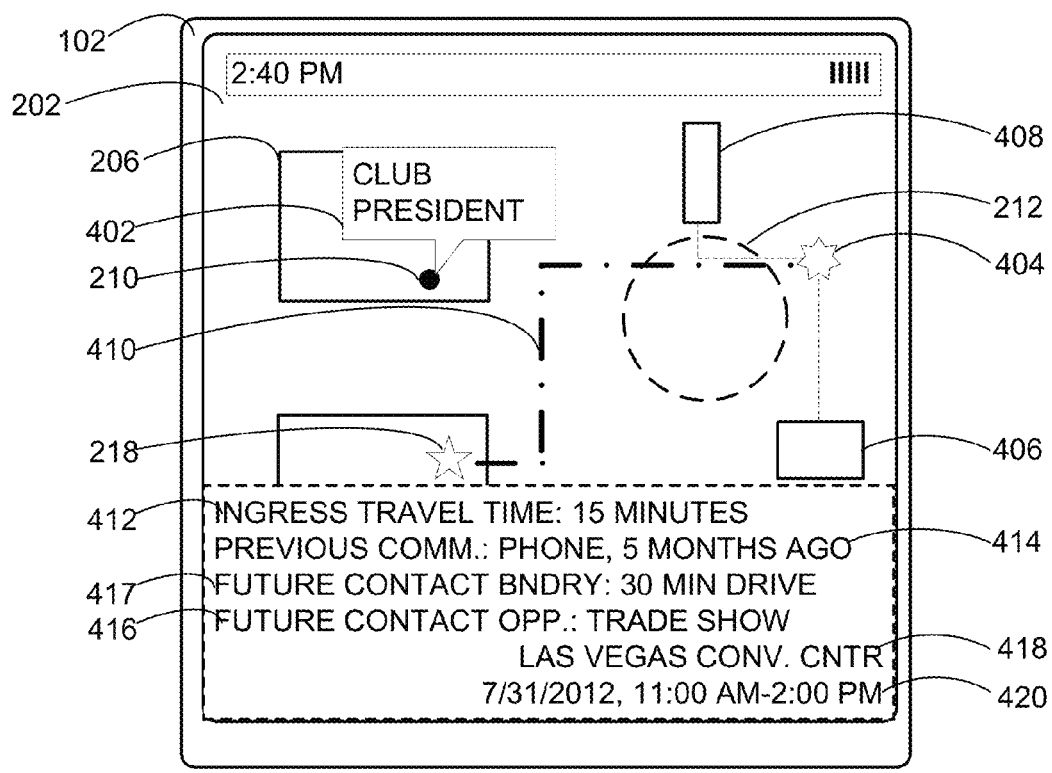
FIG. 4 is a third example of the display interface of the first device.

Referring now to FIG. 4, therein is shown a third example of the display interface 202 of the first device 102. The display interface 202 can display a participant profile 402, a present target location 404, a past target location 406, a future target location 408, an ingress travel route 410, an ingress travel time 412, a previous-communication reminder 414, a future contact opportunity 416, a future contact boundary 417, an opportune location 418, and an opportune time 420.

The participant profile 402 is a description of the event participant 210. For example, the participant profile 402 can include name, pseudonym, contact information, registration information, online profile, job title, age, physical attributes, or a combination thereof.

The participant profile 402 can be defined by the event participant 210, the user, the location based system 100, or combination thereof. For example, the participant profile 402 can be the self introduction of the event participant 210, the user's notes for remembering the event participant 210, or the account information associated with the event participant 210. The location based system 100 can search the internet or a data base and collect relevant information to define the participant profile 402.

The present target location 404 is the current geographic location of the matching target 216 of FIG. 2. The present target location 404 can be represented by a visual representation in relation to surrounding entities or by location information. For example, the present target location 404 can be represented by a visual mark overlaid on a map or by set of coordinates, such as GPS coordinate or longitude and latitude.

The past target location 406 is the geographic location where the matching target 216 was before the search time window 214 of FIG. 2. For example, the past target location 406 can be the location where the matching target 216 was before the matching target 216 started traversing to a location within the geofence 212. Also, for example, the past target location 406 can be the location where the matching target 216 had attended the meeting occurring before the search time window 214.

The future target location 408 is the geographic location where the matching target 216 will be or is scheduled to be in the future. For example, the future target location 408 can be the destination of the route that the matching target 216 is traversing. Also, for example, the future target location 408 can be the location of Trade Show X, occurring tomorrow, to which the matching target 216 has registered to attend.

The ingress travel route 410 is the route that the matching target 216 can traverse to go from the present target location 404 to the device location 218. The matching target 216 can traverse the ingress travel route 410 to meet the user at user's present location. The ingress travel time 412 is the estimated amount of time for the matching target 216 to traverse the ingress travel route 410 and arrive at the device location 218.

The previous-communication reminder 414 is a notice to remind the user of the location based system 100 that the user has communicated with the matching target 216 in the past and the details of the last occurring communication. The location based system 100 can display the previous-communication reminder 414 if the matching target 216 has ever communicated with the user using any available means of communication. The previous-communication reminder 414 can also display when the last communication occurred and the means of the communication.

The future contact opportunity 416 is a time and place, or an event in the future where the user is scheduled or could be scheduled to be within a threshold distance or time from the matching target 216. The future contact opportunity 416 can be used to schedule a meeting with the matching target 216.

The future contact boundary 417 is the threshold distance or time for determining the future contact opportunity 416. One possible setting for the future contact boundary 417 is the close contact boundary 226. The future contact boundary 417 can be determined as a set distance, such as 5 miles or within the building where the meeting is held, encompassing where the user is scheduled to be at a future time. The future contact boundary 417 can also be determined as an estimated time, such as 15 minute drive or 10 minute walk. The future contact boundary 417 can be determined by the user, the location based system 100, the software manufacturer, or combination thereof.

The future contact opportunity 416 can include the opportune location 418 and the opportune time 420. The opportune location 418 is a possible location for the future contact opportunity 416. The opportune location 418 is either a physical location or a virtual location, which is a location in a computer simulation or computer simulate world. The opportune location 418 can be the location where the matching target 216 is scheduled to be within the future contact boundary 417.

The opportune time 420 is a possible time of the future contact opportunity 416. The opportune time 420 can be the date and time when the matching target 216 is scheduled to be within the future contact boundary 417.

The future contact opportunity 416 can be the event 204 of FIG. 2 occurring in the future, that both the user and the matching target 216 will attend. For example, if both the user and the matching target 216 are scheduled to attend next week's trade show, the trade show can be the future contact opportunity 416 where the two can meet. The event location 206 can be the opportune location 418 and the event time 208 of FIG. 2 can be the opportune time 420.

The future contact opportunity 416 can also be the event 204 the matching target 216 will attend, where the event location 206 of FIG. 2 is within the future contact boundary 417. For example, if the matching target 216 is scheduled to be within 5 miles of the user during a time when the user will be at a convention, the convention can be the future contact opportunity 416. In the example, the scheduled location of the matching target 216 can be the opportune location 418. Similarly, the time period during which the matching target 216 will be within the threshold distance can be the opportune time 420.

Figure 5:
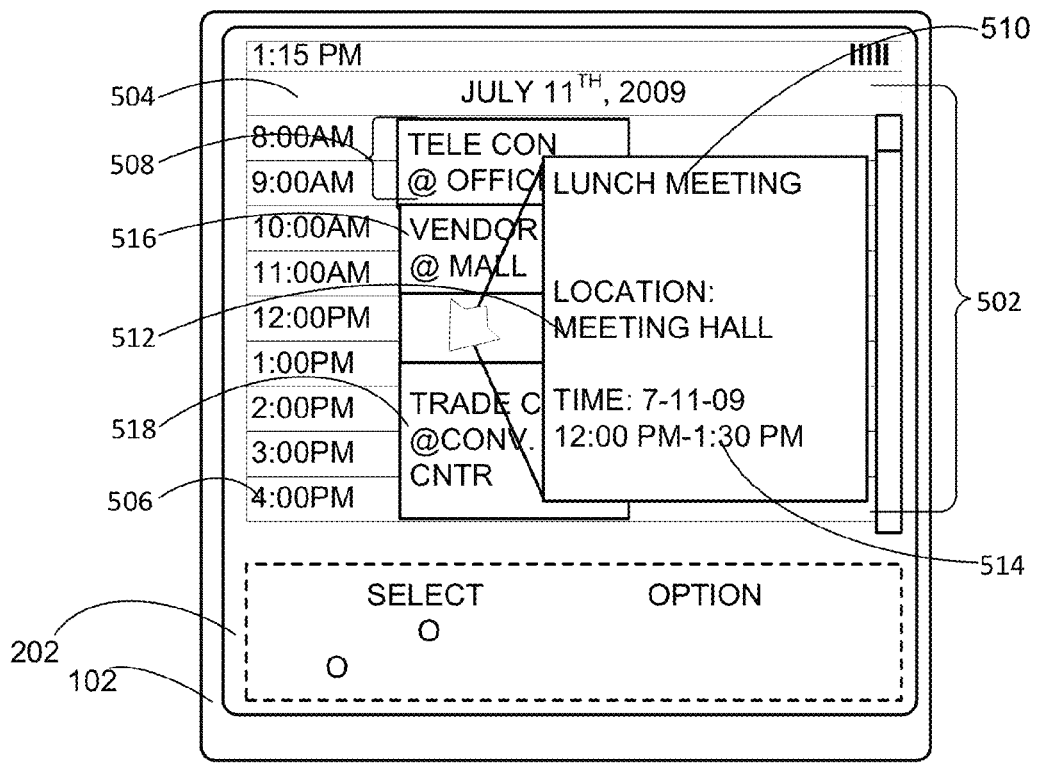
FIG. 5 is a fourth example of the display interface of the first device.

Referring now to FIG. 5, therein is shown a fourth example of the display interface 202 of the first device 102. The display interface 202 can display a schedule calendar 502.

The schedule calendar 502 is a representation of time and scheduled events of a person, entity, or thing. For example, the schedule calendar 502 can be an electronic calendar, such as Microsoft Outlook, or a flight schedule. The schedule calendar 502 can have a calendar date 504, a time segment 506, a calendar event 508, an appointment purpose 510, an appointment location 512, an appointment time period 514, a participant prior location 516, and a participant future location 518.

The calendar date 504 is a date within the schedule calendar 502. The time segment 506 divides up the time represented in the calendar date 504. For example, the time segment 506 can be a minute, an hour, a day, a week, or a combination thereof or spanning a multiple of each.

The calendar event 508 is a scheduled event or a tentatively scheduled event. The calendar event 508 can represent a meeting, a task, or a reminder. For example, the calendar event 508 can be teleconference with a vendor or a reminder to attend a trade conference. The calendar event 508 can have the appointment purpose 510, the appointment location 512, and the appointment time period 514.

The appointment purpose 510 is the purpose of the calendar event 508. For example, the appointment purpose 510 can be the title of the calendar event, such as "Lunch Meeting" or Trade Conference. Also, for example, the appointment purpose 510 can represent the type, goal, or desired attendee for the meeting.

The appointment location 512 is the geographic location, a virtual location, or contact information such as a conference call number for the calendar event 508. For example, the appointment location 512 can be set by selecting an address, cross streets, a famous landmark, or longitude and latitude coordinates. The appointment location 512 can also represent a location in a virtual world.

The participant prior location 516 is where the subject or user of the schedule calendar 502 was or is scheduled to be before a designated time. The participant prior location 516 can be represented by an address, cross streets, famous landmark, longitude and latitude coordinates, or a location in a virtual world. For example, in relation to the lunch meeting occurring on Jul. 11, 2009, between 12:00 pm to 1:30 pm, the participant prior location 516 can be the mall, where the meeting with the vendor scheduled between 10:00 am and 12:00 pm.

Similarly, the participant future location 518 is where the subject or user of the schedule calendar 502 is going to or scheduled to be after a designated time. Continuing with the previous example, in relation to the lunch meeting occurring on Jul. 11, 2009, between 12:00 pm to 1:30 pm, the participant future location 518 can be the convention center, where the event participant 210 is scheduled to attend the trade conference from 1:30 pm to 4:00 pm.

Figure 6:
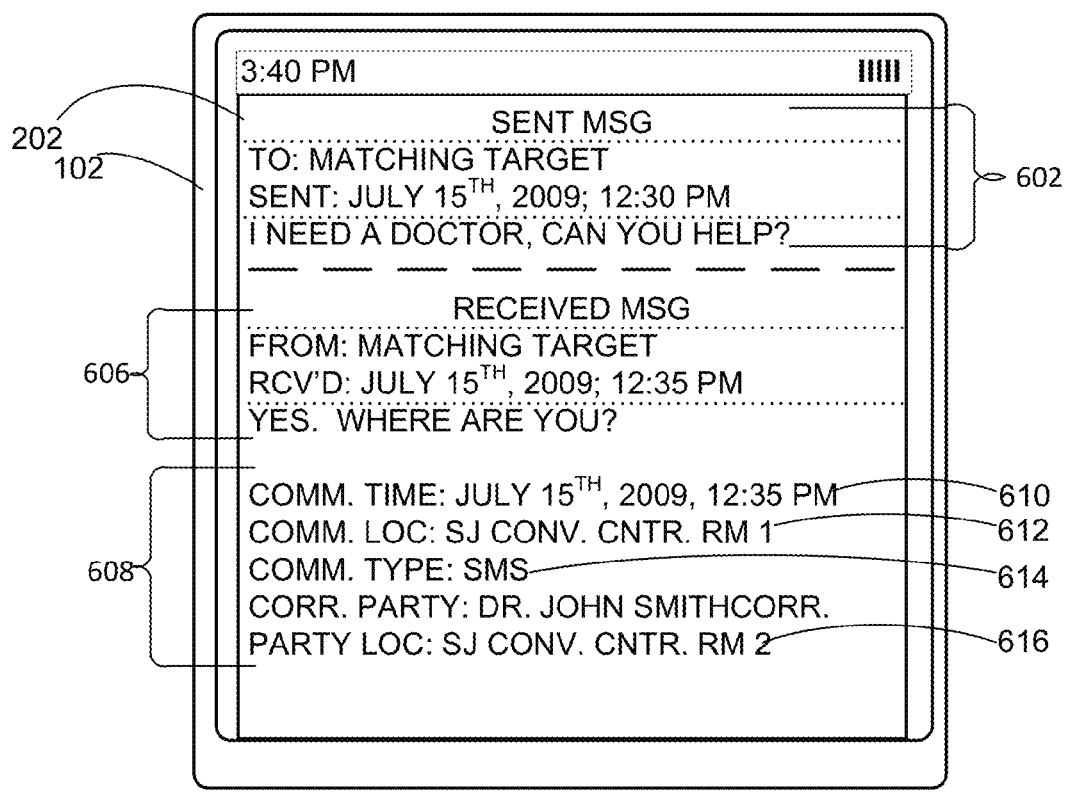
FIG. 6 is a fifth example of the display interface of the first device.

Referring now to FIG. 6, therein is shown a fifth example of the display interface 202 of the first device 102. The display interface 202 can show an initial message 602, a reply message 606, a communication profile 608, a communication time 610, a communication location 612, a communication type 614, and a participant communication location 616.

The initial message 602 is the communication between user of the location based system 100 and the event participant 210 of FIG. 2. Although the initial message 602 is called "initial," it is not necessarily the first message between the user of the location based system 100 and the event participant 210. The initial message 602 can be spoken, written, pictorial, or video communication. For example, the initial message 602 can be a phone conversation, video conference, voice mail, short message system, or electronic mail.

The reply message 606 represents a response from the event participant 210 to the user in the case that the initial message 602 did not provide for interactive participation from the event participant 210, such as in e-mail for SMS. For example, the reply message 606 can be a reply SMS to an e-mail or a call back in response to voice mail.

The communication profile 608 is a record containing the details of the communication between the user and the event participant 210. For example, the communication profile 608 can be a call log for a phone conversation or meeting minutes from a virtual conference meeting. The communication profile 608 can include details such as the identity of the event participant 210, the communication time 610, the communication location 612, the communication type 614, and the participant communication location 616.

The communication time 610 is a record of a particular time or span of time of the communication between the user and the event participant 210. The communication time 610 can be the time when the initial message 602 started. When the reply message 606 exists, the communication time 610 can be the time when the reply message 606 started.

The communication time 610 can be represented in a number of different formats or with different relational information. For example, the communication time 610 can be represent with date and time information and format as Jul. 15, 2009, 12:30 pm. The communication time 610 can also be represented relative to the current date or time, such as "yesterday" or "an hour ago." The communication time 610 can also be represented relative to an event, such as "Day Two" of the conference.

The communication location 612 is a record of where the user was when a particular communication occurred with the event participant 210. The communication location 612 can be represented by the event location 206 or the address or coordinate equivalent to where the user was at the communication time 610.

The participant communication location 616 is a record of where the event participant 210 was when a particular communication occurred with the event participant 210. The participant communication location 616 can be represented by the event location 206, by a relative location to the user of the location based system 100, or by the address or coordinate equivalent to where the event participant 210 was located at the communication time 610.

The communication type 614 is a record of the type of communication between the user and the event participant 210. For example, the communication type 614 can denote whether the communication was via e-mail, SMS, video, virtual world, or over the phone.

Figure 7:
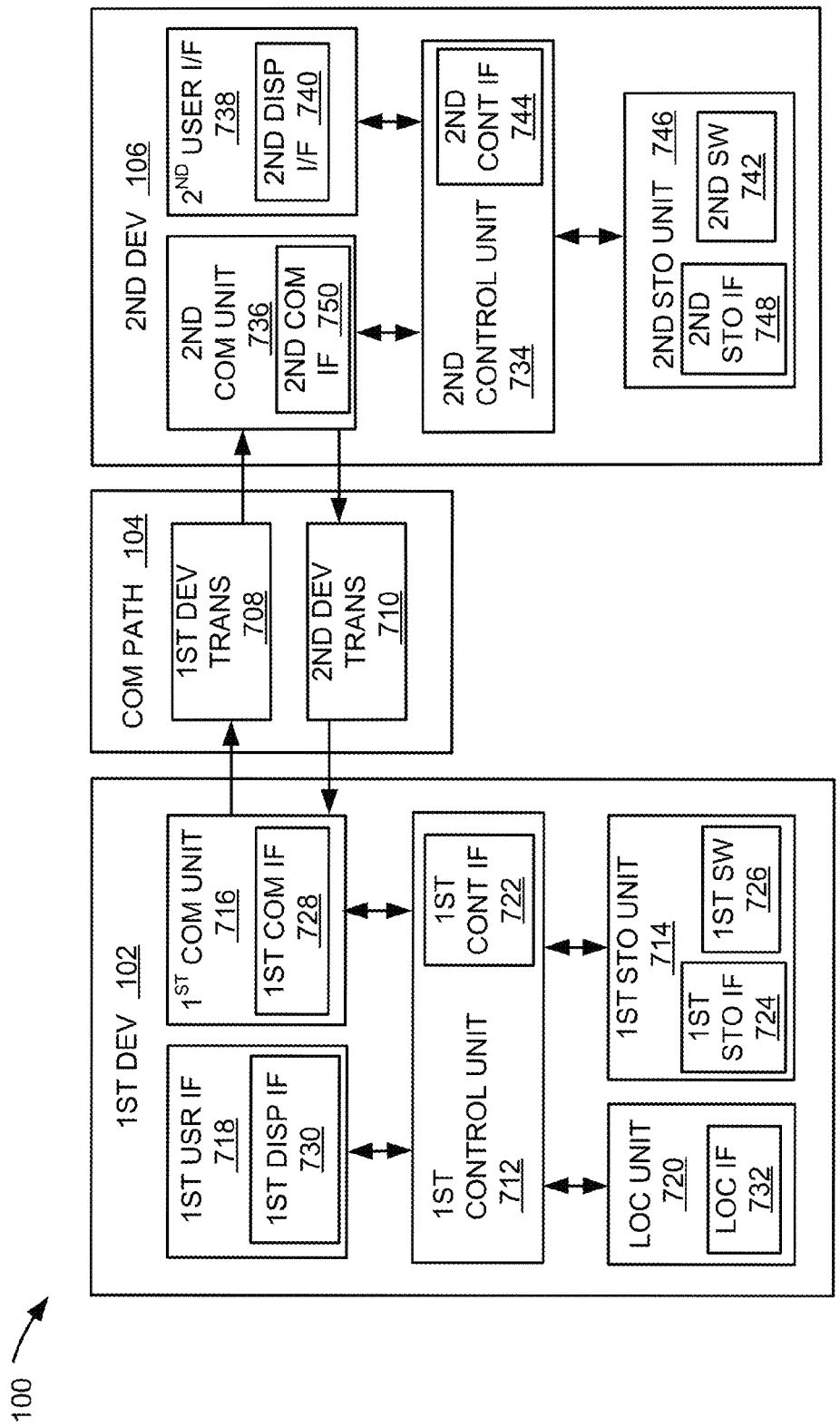
FIG. 7 is an exemplary block diagram of the location based system with contextual locator mechanism.

Referring now to FIG. 7, therein is shown an exemplary block diagram of the location based system 100 with contextual locator mechanism. The location based system 100 can include a first device 102, a communication path 104, and a second device 106.

The first device 102 can communicate with the second device 106 over the communication path 104. For example, the first device 102, the communication path 104, and the second device 106 can be the first device 102 of FIG. 1, the communication path 104 of FIG. 1, and the second device 106 of FIG. 1, respectively. The screen shot shown on the display interface 202 described in FIG. 2 can represent the screen shot for the location based system 100.

The first device 102 can send information in a first device transmission 708 over the communication path 104 to the second device 106. The second device 106 can send information in a second device transmission 710 over the communication path 104 to the first device 102.

For illustrative purposes, the location based system 100 is shown with the first device 102 as a client device, although it is understood that the location based system 100 can have the first device 102 as a different type of device. For example, the first device 102 can be a server.

Also for illustrative purposes, the location based system 100 is shown with the second device 106 as a server, although it is understood that the location based system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 712, a first storage unit 714, a first communication unit 716, a first user interface 718, and a location unit 720. The first device 102 can be similarly described by the first device 102. The first control unit 712 can include a first control interface 722. The first storage unit 714 can include a first storage interface 724.

The first control unit 712 can execute a first software 726 to provide the intelligence of the location based system 100. The first control unit 712 can operate the first user interface 718 to display information generated by the location based system 100. The first control unit 712 can also execute the first software 726 for the other functions of the location based system 100, including receiving location information from the location unit 720. The first control unit 712 can further execute the first software 726 for interaction with the communication path 104 of FIG. 1 via the first communication unit 716.

The first control unit 712 can be implemented in a number of different manners. For example, the first control unit 712 can be a processor, an embedded processor, a microprocessor, a hardware control logic, a hardware finite state machine, a digital signal processor, or a combination thereof.

The first control unit 712 can include a first control interface 722. The first control interface 722 can be used for communication between the first control unit 712 and other functional units in the first device 102. The first control interface 722 can also be used for communication that is external to the first device 102.

The first control interface 722 can receive information from the other functional units or from external sources, or can transmit information to the other functional units or to external destinations. The external sources and the external destinations refer to sources and destinations external to the first device 102.

The first control interface 722 can be implemented in different ways and can include different implementations depending on which functional units or external units are being interfaced with the first control interface 722. For example, the first control interface 722 can be implemented with a pressure sensor, an inertial sensor, a microelectromechanical system, optical circuitry, waveguides, wireless circuitry, wireline circuitry, or a combination thereof.

The first storage unit 714 can store a first software 726. The first storage unit 714 can also store the relevant information, such as advertisements, points of interest, navigation routing entries, or any combination thereof.

The first storage unit 714 can be a volatile memory, a nonvolatile memory, an internal memory, an external memory, or a combination thereof For example, the first storage unit 714 can be a nonvolatile storage such as non-volatile random access memory, Flash memory, disk storage, or a volatile storage such as static random access memory.

The first storage unit 714 can include a first storage interface 724. The first storage interface 724 can be used for communication between the location unit 720 and other functional units in the first device 102. The first storage interface 724 can also be used for communication that is external to the first device 102.

The first storage interface 724 can receive information from the other functional units or from external sources, or can transmit information to the other functional units or to external destinations. The external sources and the external destinations refer to sources and destinations external to the first device 102.

The first storage interface 724 can include different implementations depending on which functional units or external units are being interfaced with the first storage unit 714. The first storage interface 724 can be implemented with technologies and techniques similar to the implementation of the first control interface 722.

The first communication unit 716 can enable external communication to and from the first device 102. For example, the first communication unit 716 can permit the first device 102 to communicate with the second device 106 of FIG. 1, an attachment, such as a peripheral device or a computer desktop, and the communication path 104.

The first communication unit 716 can also function as a communication hub allowing the first device 102 to function as part of the communication path 104 and not limited to be an end point or terminal unit to the communication path 104. The first communication unit 716 can include active and passive components, such as microelectronics or an antenna, for interaction with the communication path 104.

The first communication unit 716 can include a first communication interface 728. The first communication interface 728 can be used for communication between the first communication unit 716 and other functional units in the first device 102. The first communication interface 728 can receive information from the other functional units or can transmit information to the other functional units.

The first communication interface 728 can include different implementations depending on which functional units are being interfaced with the first communication unit 716. The first communication interface 728 can be implemented with technologies and techniques similar to the implementation of the first control interface 722.

The first user interface 718 allows a user to interface and interact with the first device 102. The first user interface 718 can include an input device and an output device. Examples of the input device of the first user interface 718 can include a keypad, a touchpad, soft-keys, a keyboard, a microphone, or any combination thereof to provide data and communication inputs.

The first user interface 718 can include a first display interface 730. Examples of the output device of the first user interface 718 can include the first display interface 730. The first display interface 730 can include a display, a projector, a video screen, a speaker, or any combination thereof.

The location unit 720 can generate location information, current heading, and current speed of the first device 102, as examples. The location unit 720 can be implemented in many ways. For example, the location unit 720 can function as at least a part of a global positioning system, an inertial navigation system, a cellular-tower location system, a pressure location system, or any combination thereof.

The location unit 720 can include a location interface 732. The location interface 732 can be used for communication between the location unit 720 and other functional units in the first device 102. The location interface 732 can also be used for communication that is external to the first device 102.

The location interface 732 can receive information from the other functional units or from external sources, or can transmit information to the other functional units or to external destinations. The external sources and the external destinations refer to sources and destinations external to the first device 102.

The location interface 732 can include different implementations depending on which functional units or external units are being interfaced with the location unit 720. The location interface 732 can be implemented with technologies and techniques similar to the implementation of the first control unit 712.

For illustrative purposes, the first device 102 is shown with the partition having the first control unit 712, the first storage unit 714, the first user interface 718, the first communication unit 716, and the location unit 720 although it is understood that the location based system 100 can have a different partition. For example, the first software 726 can be partitioned differently such that some or all of its function can be in the first control unit 712, the location unit 720, and the first communication unit 716. Also, the first device 102 can include other functional units not shown in FIG. 7 for clarity.

The functional units in the first device 102 can work individually and independently of the other functional units. The first device 102 can work individually and independently from the second device 106 and the communication path 104.

The second device 106 can be optimized for implementing the present invention in a multiple device embodiment with the first device 102. The second device 106 can provide the additional or higher performance processing power compared to the first device 102. The second device 106 can include a second control unit 734, a second communication unit 736, and a second user interface 738.

The second user interface 738 allows a user to interface and interact with the second device 106. The second user interface 738 can include an input device and an output device. Examples of the input device of the second user interface 738 can include a keypad, a touchpad, soft-keys, a keyboard, a microphone, or any combination thereof to provide data and communication inputs. Examples of the output device of the second user interface 738 can include a second display interface 740. The second display interface 740 can include a display, a projector, a video screen, a speaker, or any combination thereof.

The second control unit 734 can execute a second software 742 to provide the intelligence of the second device 106 of the location based system 100. The second software 742 can operate in conjunction with the first software 726. The second control unit 734 can provide additional performance compared to the first control unit 712.

The second control unit 734 can operate the second user interface 738 to display information. The second control unit 734 can also execute the second software 742 for the other functions of the location based system 100, including operating the second communication unit 736 to communicate with the first device 102 over the communication path 104.

The second control unit 734 can be implemented in a number of different manners. For example, the second control unit 734 can be a processor, an embedded processor, a microprocessor, a hardware control logic, a hardware finite state machine, a digital signal processor, or a combination thereof.

The second control unit 734 can include a second controller interface 744. The second controller interface 744 can be used for communication between the second control unit 734 and other functional units in the second device 106. The second controller interface 744 can also be used for communication that is external to the second device 106.

The second controller interface 744 can receive information from the other functional units or from external sources, or can transmit information to the other functional units or to external destinations. The external sources and the external destinations refer to sources and destinations external to the second device 106.

The second controller interface 744 can be implemented in different ways and can include different implementations depending on which functional units or external units are being interfaced with the second controller interface 744. For example, the second controller interface 744 can be implemented with a pressure sensor, an inertial sensor, a microelectromechanical system, optical circuitry, waveguides, wireless circuitry, wireline circuitry, or a combination thereof.

A second storage unit 746 can store the second software 742. The second storage unit 746 can also store the relevant information, such as advertisements, points of interest, navigation routing entries, or any combination thereof. The second storage unit 746 can be sized to provide the additional storage capacity to supplement the first storage unit 714.

For illustrative purposes, the second storage unit 746 is shown as a single element, although it is understood that the second storage unit 746 can be a distribution of storage elements. Also for illustrative purposes, the location based system 100 is shown with the second storage unit 746 as a single hierarchy storage system, although it is understood that the location based system 100 can have the second storage unit 746 in a different configuration. For example, the second storage unit 746 can be formed with different storage technologies forming a memory hierarchal system including different levels of caching, main memory, rotating media, or off-line storage.

The second storage unit 746 can be a volatile memory, a nonvolatile memory, an internal memory, an external memory, or a combination thereof. For example, the second storage unit 746 can be a nonvolatile storage such as non-volatile random access memory, Flash memory, disk storage, or a volatile storage such as static random access memory.

The second storage unit 746 can include a second storage interface 748. The second storage interface 748 can be used for communication between the location unit 720 and other functional units in the second device 106. The second storage interface 748 can also be used for communication that is external to the second device 106.

The second storage interface 748 can receive information from the other functional units or from external sources, or can transmit information to the other functional units or to external destinations. The external sources and the external destinations refer to sources and destinations external to the second device 106.

The second storage interface 748 can include different implementations depending on which functional units or external units are being interfaced with the second storage unit 746. The second storage interface 748 can be implemented with technologies and techniques similar to the implementation of the second controller interface 744.

The second communication unit 736 can enable external communication to and from the second device 106. For example, the second communication unit 736 can permit the second device 106 to communicate with the first device 102 over the communication path 104.

The second communication unit 736 can also function as a communication hub allowing the second device 106 to function as part of the communication path 104 and not limited to be an end point or terminal unit to the communication path 104. The second communication unit 736 can include active and passive components, such as microelectronics or an antenna, for interaction with the communication path 104.

The second communication unit 736 can include a second communication interface 750. The second communication interface 750 can be used for communication between the second communication unit 736 and other functional units in the second device 106. The second communication interface 750 can receive information from the other functional units or can transmit information to the other functional units.

The second communication interface 750 can include different implementations depending on which functional units are being interfaced with the second communication unit 736. The second communication interface 750 can be implemented with technologies and techniques similar to the implementation of the second controller interface 744.

The first communication unit 716 can couple with the communication path 104 to send information to the second device 106 in the first device transmission 708. The second device 106 can receive information in the second communication unit 736 from the first device transmission 708 of the communication path 104.

The second communication unit 736 can couple with the communication path 104 to send information to the first device 102 in the second device transmission 710. The first device 102 can receive information in the first communication unit 716 from the second device transmission 710 of the communication path 104. The location based system 100 can be executed by the first control unit 712, the second control unit 734, or a combination thereof.

For illustrative purposes, the second device 106 is shown with the partition having the second user interface 738, the second storage unit 746, the second control unit 734, and the second communication unit 736, although it is understood that the second device 106 can have a different partition. For example, the second software 742 can be partitioned differently such that some or all of its function can be in the second control unit 734 and the second communication unit 736. Also, the second device 106 can include other functional units not shown in FIG. 7 for clarity.

The functional units in the second device 106 can work individually and independently of the other functional units. The second device 106 can work individually and independently from the first device 102 and the communication path 104.

For illustrative purposes, the location based system 100 is described by operation of the first device 102 and the second device 106. It is understood that the first device 102 and the second device 106 can operate any of the modules and functions of the location based system 100. For example, the first device 102 is described to operate the location unit 720, although it is understood that the second device 106 can also operate the location unit 720.

Figure 8:
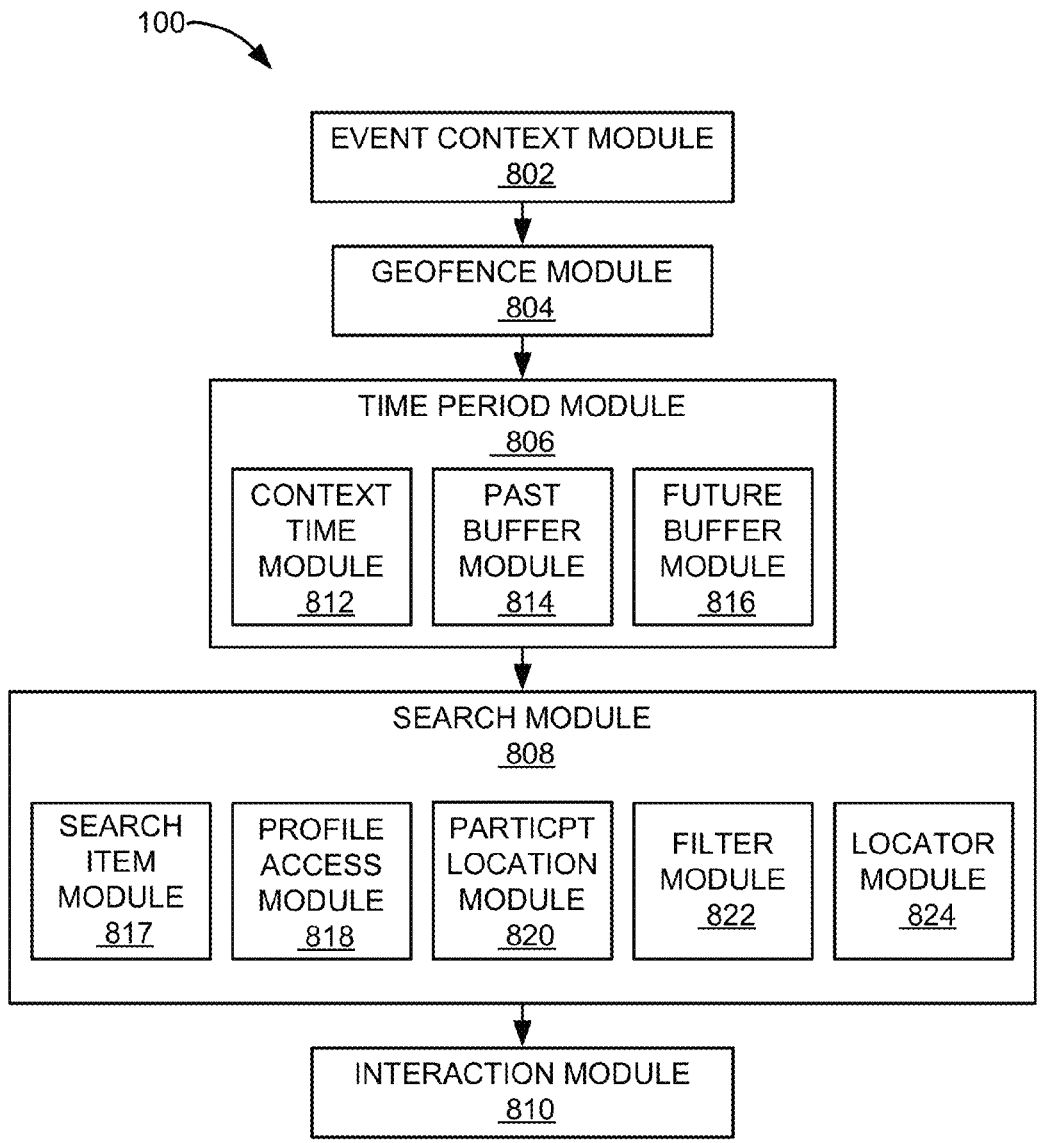
FIG. 8 is a schematic of the location based system.

Referring now to FIG. 8, therein is shown a schematic of the location based system 100. The location based system 100 can include an event context module 802, a geofence module 804, a time period module 806, a search module 808, and an interaction module 810.

The event context module 802 can be coupled to the geofence module 804, and the geofence module 804 can be coupled to the time period module 806. The time period module 806 can be then coupled to the search module 808, and the search module 808 can be coupled to the interaction module 810.

The purpose of the event context module 802 is to detect the event 204 of FIG. 2 by recognizing or determining the existence of the event 204. The event context module 802 can detect the event 204 by searching for the calendar event 508 of FIG. 5 in the user's calendar that has certain types, significance, or combination thereof.

The event context module 802 can detect the calendar event 508 that has a specific purpose, time, location, significance, a combination thereof, as the event 204. For example, calendar events such as status meetings, lunch appointments recurring on the same day of the week and/or at the same location, or the birth of a child can be detected as the event 204.

The event context module 802 can be predetermined to recognize certain purpose, types or significance, such as trade shows or meetings, as events. The user, the location based system 100, the software manufacturer, or a combination thereof can predetermine various types, such as vendor present meetings or conferences, or key phrases such as "board meeting" or "annual meeting." The event context module 802 can compare the calendar event 508 or the appointment purpose 510 to such types or search within them for the key phrases.

The event context module 802 can also detect the event 204 by searching the World Wide Web for content that matches the calendar event 508. The event context module 802 can search for a web page that contain the calendar event 508, the appointment purpose 510 of FIG. 5, the appointment location 512 of FIG. 5, the appointment time period 514 of FIG. 5, or a combination thereof.

For example, if the user is scheduled to attend a Trade Show X, the event context module 802 can search the Internet for a web page that includes any combination of dates and times, title, purpose, or location that matches the contents of the calendar event 508 Trade Show X in the user's calendar. If such web page is found, the event context module 802 can detect the calendar event 508 as the event 204.

The event 204 can be used by the search module 808 to identify the matching target 216 of FIG. 2. The event context module 802 can then pass the event 204 and the associated items, such as the event time 208 or the event location 206, to the geofence module 804.

The event context module 802 can utilize the first control unit 712 of FIG. 7 or the second control unit 734 of FIG. 7 to detect the event 204. The event context module 802 can store and access the event 204 using the first storage unit 714 of FIG. 7 or the second storage unit 746 of FIG. 7. The event context module 802 can use a combination of the first device 102 of FIG. 7 and the second device 106 of FIG. 7 through the communication path 104 of FIG. 7. For example, the event context module 802 can detect the event 204 on the first device 102 and store it in the second device 106. The event context module 802 can be a separate functional unit within the first device 102 or the second device 106 or can be a hardware unit within the first control unit 712 or the second control unit 734.

The purpose of the geofence module 804 is to establish the geofence 212 of FIG. 2 associated with the event 204. The geofence module 804 can establish the geofence 212, which can be the area for searching and locating the matching target 216 that will be partaking in the event 204. For example, the geofence module 804 can select a country, a state, a city, or can enclose a region on a map using the first user interface 718 of FIG. 7. The outer boundaries of the selected region can be the geofence 212.

The geofence module 804 can query and receive user input to establish the geofence 212. The user can draw the geofence 212 using the first user interface 718. The geofence module 804 can generate a radius to define a circular area with the first device 102 of FIG. 7 at the center as the geofence 212.

The geofence module 804 can also establish the geofence 212 based on the event location 206. The geofence module 804 can establish the geofence 212 by selecting the boundaries of the event location 206. For example, the geofence module 804 can establish the location of the walls of the conference room where the meeting is held as the geofence 212. Also for example, the geofence module 804 can establish the property lines of the expo center where the trade show is being held as the geofence 212.

The geofence module 804 can also establish the geofence 212 by generating a radius to define a circular area with the event location 206 as the center. For example, the geofence module 804 can generate a radius of 5 miles to establish the geofence 212 as all areas within 5 mile distance from the event location 206.

Alternatively, the geofence module 804 can establish the geofence 212 by selecting the adjacent surrounding city blocks and establish the outer perimeters of the city blocks as the geofence 212. For example, the geofence module 804 can establish the geofence 212 of a parade as two city blocks. The geofence 212 in such example would encompass the city blocks that are adjacent to the parade route and the city blocks that are adjacent to the first set of blocks.

The geofence module 804 can use the first control unit 712 and the location unit 720 of FIG. 7, or the second control unit 734 to establish the geofence 212. The geofence module 804 can also use a combination of the first control unit 712 and the second control unit 734 to establish the geofence 212. The geofence module 804 can store the geofence 212 in the first storage unit 714, the second storage unit 746, or a combination thereof.

The purpose of the time period module 806 is to define the time related search parameters for identifying and locating the matching target 216. For example, the time period module 806 can define the search time window 214 of FIG. 2 and the future time period 304 of FIG. 3. The time period module 806 can include a context time module 812, a past buffer module 814, and a future buffer module 816.

The purpose of the context time module 812 is to set the search time window 214 associated with the event 204. The search time window 214 can be used to identify and locate the matching target 216 that was, is, or is scheduled to be within the geofence 212 during the search time window 214. The context time module 812 can query and receive user input to define the search time window 214.

The context time module 812 can also set the search time window 214 based on the event time 208. The context time module 812 can establish the search time window 214 by selecting a time period extending and/or existing before and after the event time 208.

The amount of time added or selected to the event time 208 can be based on the event 204. For example, the search time window 214 corresponding to the event 204 of Self-Improvement may be defined as an hour before and none after the event time 208 of FIG. 2, or as after-work hours.

The context time module 812 can also establish the search time window 214 based on user preference, past history, or a combination thereof For example, the context time module 812 can suggest the search time window 214 of the calendar event 508 that is similar to the event 204, which has occurred in the past and similar or the same as the calendar event 508.

The context time module 812 can determine the calendar event 508 to be similar to the event 204 if the titles are the same. The context time module 812 can also determine similarity if the calendar event 508 occurs at the same time of the day, week, month, or year, or at the same location, or a combination thereof as the event 204.

The context time module 812 can utilize the first control unit 712, the second control unit 734, or a combination thereof to select the search time window 214. The context time module 812 can store the search time window 214 in first storage unit 714, the second storage unit 746, or a combination thereof.

The purpose of the future buffer module 816 is to set the future time period 304. The future time period 304 can be used for identifying the matching target 216 that will be arriving in the geofence 212 within the future time period 304.

The future time period 304 can be used to determine how much later than the search time window 214 the event participant 210 of FIG. 2 can arrive within the geofence 212 and still be considered as the matching target 216. The future buffer module 816 can set the future time period 304 by selecting a length of time that can be compared to the time necessary for the event participant 210 to move within the geofence 212.

The future buffer module 816 can set the future time period 304 by having a predetermined length of time set by the user, the location based system 100, or a combination thereof The future buffer module 816 can also set the future time period 304 by dynamically querying the user and receiving user inputs.

The future buffer module 816 can also set the future time period 304 based on the event 204. For example, if the event 204 requires international travel from the event participant 210 or the user, such as in United Nations meeting or the World Cup, the future buffer module 816 can set the future time period 304 to one day.

The future buffer module 816 can also set the future time period 304 based on the event 204 by assigning a predetermined value associated with the event 204. Such list can be pre-determined by the user, the location based system 100, or a combination thereof For example, the user may assign 5 minutes as the future time period 304 for all lunch appointments. Also, for example, the location based system 100 may assign 1 day as the future time period 304 for a United Nations meeting.

The future buffer module 816 can also set the future time period 304 based on the event 204 by user preference or past selections, or in proportion or relative to the event time 208. For example, if the user or the location based system 100 has previously selected the future time period 304 as 5 minutes for a lunch appointment, the future buffer module 816 can set the future time period 304 to one hour for an upcoming lunch appointment.

The event participant 210 can be identified as the matching target 216 that will be within the geofence 212, given that other factors match, if the time necessary for the event participant 210 to move within the geofence 212 is less than or equal to the future time period 304. For example, with the future time period 304 set to 30 minutes, the location based system 100 can find the event participant 210 that is running five minutes late or is scheduled to return from lunch in 10 minutes.

The purpose of the past buffer module 814 is to set the past time period 302 of FIG. 3. The past time period 302 can be used for identifying the matching target 216 that was within the geofence 212 within the past time period 302. The operation of the past buffer module 814 in setting the past time period 302 can be similar to the future buffer module 816 setting the future time period 304.

The event participant 210 can be identified as the matching target 216 that was within the geofence 212, given that other factors match, if the event participant 210 has been outside the geofence 212 for an amount of time that is less than or equal to the past time period 302. For example, with the past time period 302 set to one day, the location based system 100 can find the event participant 210 that stepped out of the geofence 212 five minutes ago to receive a phone call or left the conference one day early.

The future buffer module 816 and the past buffer module 814 can use the first control unit 712, the second control unit 734, or a combination thereof to set the past time period 302 and the future time period 304. The future buffer module 816 and the past buffer module 814 can use the first storage unit 714, the second storage unit 746, or a combination thereof to store the past time period 302 and the future time period 304.

The purpose of the search module 808 is to find and locate the matching target 216. The search module 808 can include a search item module 817, a profile access module 818, a participant location module 820, a filter module 822, and a locator module 824.

The purpose of the search item module 817 is to identify the search item 306 of FIG. 3. The search item 306 can be used to further specify the matching target 216. The search item module 817 can query the user to identify the search item 306. The search item module 817 can also identify the search item 306 based on user preference or previous selections.

The search item module 817 can also identify the search item 306 based on the event 204. For example, if the user is attending a speed dating event seeking to meet women, the search item module 817 can identify the search item 306 as woman.

The search item module 817 can use first control unit 712, the second control unit 734, the communication path 104, or a combination thereof to identify the search item 306. The search item 306 can be stored on the first storage unit 714, the second storage unit 746, or a combination thereof.

The purpose of the profile access module 818 is to access the participant profile 402 of FIG. 4. The profile access module 818 can access the participant profile 402 that is available on the location based system 100 or search the internet or a data base.

For example, the profile access module 818 can access the personal or professional web page of the event participant 210 to access the profile belonging to the event participant 210.

Also, for example, the profile access module 818 can search the internet or data bases to find publicly available information such as job title or function, attributes, characteristics, or descriptions associated with the event participant 210.

The profile access module 818 can use first control unit 712, the second control unit 734, the communication path 104, or a combination thereof to set or access the participant profile 402. The participant profile 402 can be set and stored on the first storage unit 714, the second storage unit 746, or a combination thereof.

The purpose of the participant location module 820 is to identify the event participant 210 that is associated with the event 204. The participant location module 820 can identify the event participant 210 as a person, entity, or thing that was, is, or will be taking part in the event 204. The participant location module 820 can identify the name from a registration or reservation list as the event participant 210.

The participant location module 820 can also search the schedule calendar 502 of various people. The participant location module 820 can identify the person, entity, or thing that has the calendar event 508 or the appointment purpose 510 matching the event 204 as the event participant 210. The participant location module can also identify the person, entity, or thing that has the calendar event 508 with the appointment time period 514 overlapping the event time 208 and the appointment location 512 matching or overlapping the event location 206 as the event participant 210.

The participant location module 820 can also identify the participant future location 518 of FIG. 5 and the participant prior location 516 of FIG. 5. The participant location module 820 can identify the participant prior location 516 by keeping track of where the event participant 210 is at different times and store such information. The participant location module 820 can identify the participant prior location 516 as the location occurring before the search time window 214 and within the past time period 302.

The participant location module 820 can identify the participant future location 518 by identifying the destination of the event participant 210 when the event participant 210 is actively traversing a route. The participant location module 820 can access the routing information that the event participant 210 is following to find the destination of the current travel. The participant location module 820 can identify such destination as the participant future location 518 if the event participant 210 is estimated to arrive within the future time period 304.

The participant location module 820 can also identify the participant future location 518 and the participant prior location 516 by searching the schedule calendar 502. The participant location module 820 can look for the calendar event 508 occurring before the search time window 214 and within the future time period 304. The participant location module 820 can identify the appointment location 512 of the calendar event 508 as the participant prior location 516.

The participant location module 820 can use the first control unit 712 and the location unit 720, the second control unit 734, the communication path 104, or a combination thereof to identify the participant future location 518 and the participant prior location 516. The participant location module 820 can store the two locations in the first storage unit 714, the second storage unit 746, or a combination thereof.

The purpose of the filter module 822 is to identify the matching target 216 as the event participant 210 located within the geofence 212 during the search time window 214.

The filter module 822 can identify the event participant 210 that was, is, or will be partaking in the event 204 and is located within the geofence 212 during the search time window 214 as the matching target 216.

The filter module 822 can search for the event participant 210 within the geofence 212. If the search time window 214 includes or is equivalent to the current time, the filter module 822 can acquire the position information from all event participants and compare the positioning information to the geofence 212. The event participant 210 located within the geofence 212 can be identified as the matching target 216.

The filter module 822 can acquire the location of the event participant 210 from the location based system 100. The filter module 822 can also search the schedule calendar 502 for the calendar event 508 having the appointment time period 514 of FIG. 5 that includes the current time and extract the appointment location 512 of FIG. 5 of the calendar event 508 as the location information.

The filter module 822 can account for the possibility that the matching target 216 that may be arriving late or briefly stepped out of the geofence 212. The filter module 822 can consider the participant future location 518 or the participant prior location 516.

The filter module 822 can compare the participant future location 518 to the geofence 212. If the participant future location 518 is within the geofence 212, the filter module 822 can identify the event participant 210 as the matching target 216.

The filter module 822 can compare the participant prior location 516 identified within the past time period 302 for identifying the matching target 216. The filter module 822 can compare the participant prior location 516 to the geofence 212, and identify the event participant 210 as the matching target 216 if the participant prior location 516 is within the geofence 212.

The filter module 822 can also identify the matching target 216 scheduled to be located within the geofence 212 during the search time window 214. The filter module 822 can search the schedule calendar 502 of the event participant 210 for the calendar event 508 occurring during the search time window 214. If the appointment location 512 of such calendar event is within the geofence 212, the filter module 822 can identify the event participant 210 as the matching target 216.

The filter module 822 can find the matching target 216 even if the event participant 210 is not within the geofence 212 during the search time window 214, but is or was scheduled to be. For example, the user can search for someone that is scheduled to attend the same trade conference that is also currently at the same airport as the user.

The filter module 822 can specify the matching target 216 beyond the event 204, the geofence 212, and the search time window 214. The filter module 822 can use the search item 306 specified by the search item module 817 to further specify the matching target 216.

The filter module 822 can identify the matching target 216 as the event participant 210 having the search item 306 in the participant profile 402 and was, is, or will be located in the geofence 212 during the search time window 214. The filter module 822 can narrow the search amongst the event participants that have the search item 306. Then, the filter module 822 can identify the matching target 216 based on the geofence 212 and the search time window 214 from within the narrowed group of event participants.

The filter module 822 can also search within the participant profile 402 of the event participant 210 that is, was, or is scheduled to be within the geofence 212 during the search time window 214. The filter module 822 can identify the matching target 216 as the event participant 210 having the search item 306 in the participant profile 402.

The filter module 822 can use the first control unit 712, the second control unit 734, the first storage unit 714, the second storage unit 746, the location unit 720, or a combination thereof to identify the matching target 216. The filter module 822 can use the first control unit 712, the second control unit 734, or a combination thereof to identify the search item 306 for identifying the matching target 216.

Once the filter module 822 identifies the matching target 216 the position of the matching target 216 can be displayed. The purpose of the locator module 824 is to identify the present target location 404 of the matching target 216 for displaying on a device.

The locator module 824 can identify the present target location 404 of FIG. 4 as the location information as indicated by the location unit 720 of the first device 102 belonging to the matching target 216. The locator module 824 can also identify the present target location 404 by searching the schedule calendar 502 belonging to the matching target 216. The locator module 824 can identify the appointment location 512 of the calendar event 508 currently occurring as the present target location 404.

The locator module 824 can use the first control unit 712, the second control unit 734, the location unit 720, or a combination thereof to identify the present target location 404 of the matching target 216. The locator module 824 can display the present target location 404 using the first control unit 712, the second control unit 734, the first display interface 730 of FIG. 7, the second display interface 740 of FIG. 7, or a combination thereof.

The purpose of the interaction module 810 is to identify the user interactions with the event participant 210 and remind the user of the previous interactions with the matching target 216. For example, the interaction module 810 can help the user remember the matching target 216 by reminding the user when they last met or communicated. Details of the interaction module 810 will be described below.

Figure 9:
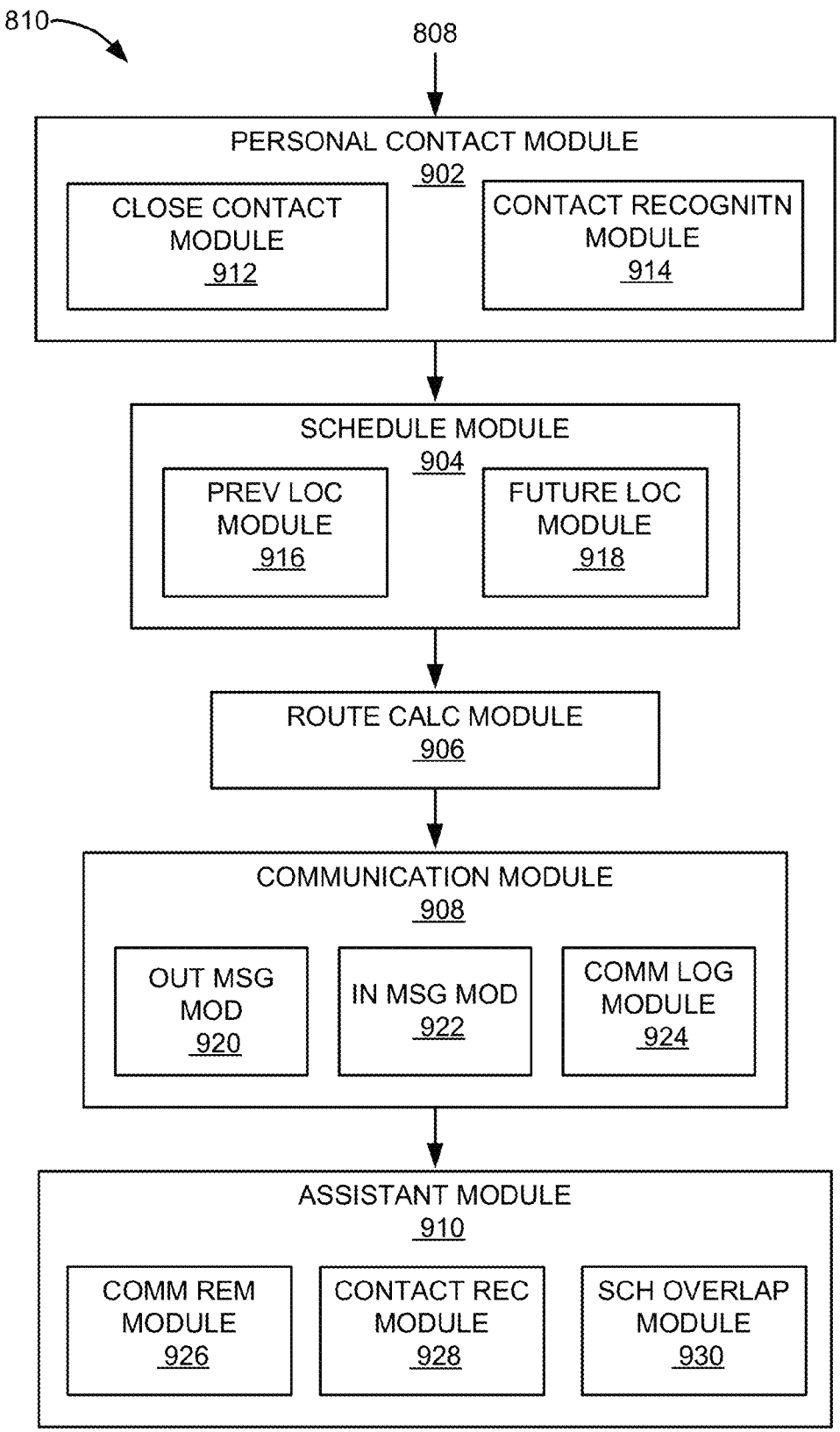
FIG. 9 is a detailed view of the interaction module of FIG. 8.

Referring now to FIG. 9, therein is shown a detailed view of the interaction module 810 of FIG. 8. The interaction module 810 can include a personal contact module 902, a schedule module 904, a route calculation module 906, a communication module 908, and an assistant module 910.

The purpose of the personal contact module 902 is to keep track of the event participant 210 of FIG. 2 encountered by the user of the location based system 100. The personal contact module 902 can include a close contact module 912 and a contact recognition module 914.

The personal contact module 902 can be coupled to the schedule module 904, which can be also coupled to the route calculation module 906. The route calculation module 906 can be coupled to the communication module 908, which can be also coupled to the assistant module 910.

The purpose of the close contact module 912 is to establish the close contact boundary 226 of FIG. 2. The close contact module 912 can establish the close contact boundary 226 by determining an appropriate distance or boundary based on the event 204. The close contact module 912 can determine the close contact boundary 226 by matching the type of the event 204 to the distances associated with different types. The location based system 100, the user, or combination thereof can predetermine the distances associated to different types of events.

For example, the location based system 100 or the user can predetermine the close contact boundary 226 as 3 feet for conventions. The close contact module 912 can establish the close contact boundary 226 as 3 feet for the event 204 if it is a convention.

The close contact module 912 can also establish the close contact boundary 226 based on the number of participants for the event 204. For example, if the event 204 is the weekly staff meeting for a staff of ten people, the close contact boundary 226 can be established as the meeting room, the event location 206. Also, for example, if the event 204 is a yearly comic book convention with thousands of participants, the close contact boundary 226 can be established as 2 feet to distinguish the participants that the user may have contacted.

The close contact module 912 can also establish the close contact boundary 226 by querying the user and receiving user input. The close contact module 912 can establish the close contact boundary 226 based on user preference or previous selections. The close contact module 912 can also establish the close contact boundary 226 based on the event 204 of FIG. 2. For example, the close contact module 912 can recall that the user had selected five-foot radius at a previous group session and establish the close contact boundary 226 as five-foot radius for the event 204 similar in nature to the previous group session.

The close contact module 912 can use the first control unit 712 of FIG. 7, the second control unit 734 of FIG. 7, the location unit 720 of FIG. 7, or a combination thereof to establish the close contact boundary 226. The close contact module 912 can use the first storage unit 714 of FIG. 7, the second storage unit 746 of FIG. 7, or a combination thereof to store the close contact boundary 226.

The purpose of the contact recognition module 914 is to detect the contact event 220 when the event participant 210 is located within the close contact boundary 226 during the event 204. The contact recognition module 914 can detect the contact event 220 comparing the close contact boundary 226 to the location of the event participant 210 during the event time 208 and when the first device 102 is at the event location 206.

The contact recognition module 914 can detect the contact event 220 when the event participant 210 is geographically located within the close contact boundary 226. The contact recognition module 914 can be deactivated or remain idle if the user is not at the event location 206 or outside of the event time 208.

The contact recognition module 914 can use the first control unit 712, the second control unit 734, the location unit 720, or a combination thereof to identify the contact event 220. The contact recognition module 914 can associate the contact event 220 to the event participant 210 using the first control unit 712, the second control unit 734, the first storage unit 714, the second storage unit 746, or a combination thereof The contact recognition module 914 can record the contact event 220 by storing the contact event 220, the association to the event participant 210, the contact time 222, the contact location 224, or a combination thereof to the first storage unit 714, the second storage unit 746, or a combination thereof.

The purpose of the schedule module 904 is to identify where the matching target 216 was or will be. The schedule module 904 can include a previous location module 916 and a future location module 918.

The purpose of the previous location module 916 is to identify the past target location 406 of FIG. 4 for displaying on a device. The location based system 100 can use the past target location 406 that involved an interaction with the matching target 216. For example, the user may not want to contact the matching target 216 regarding a sales offer if the past target location 406 is a funeral home.

The previous location module 916 can identify the past target location 406 by acquiring past location information of the event participant 210 from the participant location module 820 of FIG. 8. If the matching target 216 is en route, the previous location module 916 can access the route information the matching target 216 is using from the location based system 100. The previous location module 916 can identify the past target location 406 as the departure point of such travel.

The previous location module 916 can also identify the past target location 406 by searching the schedule calendar 502 of FIG. 5 belonging to the matching target 216. The previous location module 916 can start with the search time window 214 of FIG. 2 in the schedule calendar 502 and search backwards to find the calendar event 508 of FIG. 5 occurring before the search time window 214. The previous location module 916 can identify the appointment location 512 of FIG. 5 of the calendar event 508 as the past target location 406.

The previous location module 916 can identify the past target location 406 in reference to the search time window 214 as described above. If the search time window 214 occurs in the past or in the future, the previous location module 916 can identify the past target location 406 in reference to current time. The above described searching process in the schedule calendar 502 will start from current time and move backwards in time instead of starting from the search time window 214.

The purpose of the future location module 918 is to identify the future target location 408 of FIG. 4. Similar to the past target location 406, the user can use the future target location 408 to interact with the matching target 216.

The operations of the future location module 918 can be similar to the previous location module 916. The future location module 918 can identify the destination of the matching target 216 that is en route as the future target location 408. The future location module 918 can also search forward in time within the schedule calendar 502 to identify the future target location 408.

The previous location module 916 and the future location module 918 can use the first control unit 712, the second control unit 734, the location unit 720, or a combination thereof to identify the future target location 408 and the past target location 406. The previous location module 916 and the future location module 918 can display the future target location 408 and the past target location 406 using the first control unit 712, the second control unit 734, the first display interface 730 of FIG. 7, the second display interface 740 of FIG. 7, or a combination thereof.

The purpose of the route calculation module 906 is to calculate the ingress travel route 410 of FIG. 4 from the present target location 404 of FIG. 4 to the device location 218 of FIG. 2 and the ingress travel time 412 of FIG. 4 for arriving at the device location 218. The route calculation module 906 can assist the user by calculating a way for the matching target 216 to go from the present target location 404 of FIG. 4 to the user, which the user can send to the matching target 216.

For example, once the user locates the matching target 216 that is a medical doctor within the convention center, the user can direct the matching target 216 where the user is using the ingress travel route 410. The route calculation module 906 can pass the ingress travel route 410 and the ingress travel time 412 to the communication module 908 for sending to the matching target 216.

The route calculation module 906 can use the first control unit 712, the second control unit 734, the location unit 720, or a combination thereof to calculate the ingress travel route 410 and the ingress travel time 412. The route calculation module 906 can store the ingress travel route 410 and the ingress travel time 412 on the first storage unit 714, the second storage unit 746, or a combination thereof.

The purpose of the communication module 908 is to enable communication with the matching target 216 and to log relevant information regarding all communication. The communication module 908 can include an outgoing message module 920, an incoming message module 922, and a communication logging module 924.

The purpose of the outgoing message module 920 is to send the initial message 602 of FIG. 6 to the matching target 216. The outgoing message module 920 can enable the user to call, send a SMS, instant message, fax, e-mail, or a combination thereof, to the matching target 216. The outgoing message module 920 can also send the ingress travel route 410, the ingress travel time 412, the device location 218, or a combination thereof to the matching target 216.

The purpose of the incoming message module 922 is to receive the reply message 606 from the matching target 216. When the initial message 602 is interactive, such as in instant message or phone call, the incoming message module 922 may not be necessarily executed. The outgoing message module 920 and the incoming message module 922 can use the first control unit 712, the second control unit 734, the communication path 104 of FIG. 7, the first user interface 718 of FIG. 7, the second user interface 738 of FIG. 7 or a combination thereof to communicate with the matching target 216.

The purpose of the communication logging module 924 is to log the communication profile 608 of FIG. 6, having the event participant 210, the communication time 610 of FIG. 6, the communication location 612 of FIG. 6, the communication type 614 of FIG. 6, and the participant communication location 616 of FIG. 6. The communication logging module can store the details describing a communication that occurred with a user and the event participant 210. The communication logging module 924 can log the communication profile 608 by storing the contact event 220 in the first storage unit 714, the second storage unit 746, or a combination thereof.

The purpose of the assistant module 910 is to assist the user in interacting with the matching target 216. The assistant module 910 can include a communication reminder module 926, a contact recorder module 928, and a schedule overlap module 930.

The purpose of the communication reminder module 926 is to display the previous-communication reminder 414 of FIG. 4 based on matching the event participant 210 of the communication profile 608 and the matching target 216. The communication reminder module 926 can determine if the user and the matching target 216 has corresponded by searching for the communication profile 608 that has the event participant 210 identical to the matching target 216.

If the user has communicated with the matching target 216, the communication reminder module 926 can display a text, icon, picture, color, or a combination thereof as the previous-communication reminder 414 to notify the user. The communication reminder module 926 can display the communication profile 608 for the matching communication or a link to the communication profile 608 as the previous-communication reminder 414. The communication reminder module 926 can also use a sound or a sequence of sounds as the previous-communication reminder 414.

The communication reminder module 926 can use the first control unit 712, the second control unit 734, or a combination thereof to determine if the user and the matching target 216 have corresponded. The communication reminder module 926 can display the previous-communication reminder 414 using the first control unit 712, the second control unit 734, the first display interface 730, the second display interface 740, or a combination thereof.

The purpose of the contact recorder module 928 is to record the contact event 220 of FIG. 2, having the contact time 222 of FIG. 2 and the contact location 224 of FIG. 2. The contact recorder module 928 can store the time at the instant that the contact event 220 occurs as the contact time 222. The contact recorder can store the location of the event participant 210 at the contact event 220 as the contact location 224.

The contact event 220, having the contact time 222 and the contact location 224, can be associated with the event participant 210 and stored, so that the event participant 210 and the contact event 220 will be linked or grouped together. When the user identifies the event participant 210 as the matching target 216 at a later time, the contact event 220 can be used to remind the user of the encounter or interaction the user may have had with the matching target 216.

The contact recorder module 928 can use the first control unit 712, the second control unit 734, the location unit 720, or a combination thereof to identify the contact event 220. The contact recorder module 928 can associate the contact event 220 to the event participant 210 using the first control unit 712, the second control unit 734, the first storage unit 714, the second storage unit 746, or a combination thereof The contact recorder module 928 can record the contact event 220 by storing the contact event 220, the association to the event participant 210, the contact time 222, the contact location 224, or a combination thereof to the first storage unit 714, the second storage unit 746, or a combination thereof.

The purpose of the schedule overlap module 930 is to identify the future contact opportunity 416 of FIG. 4, having the opportune location 418 of FIG. 4 and the opportune time 420 of FIG. 4, based on matching the future target location 408 and the calendar event 508. The user can take the future contact opportunity 416 into consideration.

For example, the user can just wait to contact the matching target 216 if both the user and the matching target 216 are scheduled to attend the same conference tomorrow. Also, for example, the user can ask for a meeting around the time when the two are scheduled to be near each other.

The schedule overlap module 930 can identify the future contact opportunity 416 by comparing the user's schedule, such as the schedule calendar 502 belonging to the user, to the schedule calendar 502 belonging to the matching target 216. The schedule overlap module 930 can compare the time and location of the user's scheduled events to the appointment location 512 and the appointment location 512 in the schedule calendar 502 belonging to the matching target 216.

The schedule overlap module 930 can identify the future contact opportunity 416 as the calendar event 508 of the matching target 216 that occurs within a predetermined amount of time and within a predetermined amount of distance from the user's future scheduled events. The threshold time and distance for identifying the future contact opportunity 416 can be predetermined by the user, the location based system 100, the software manufacturer, or a combination thereof.

The schedule overlap module 930 can have predetermined distances, such as 5 miles or average 10 minute driving distance, for identifying the future contact opportunity 416. For example, the schedule overlap module 930 can identify the calendar event 508 of the matching target 216 that will be occurring within 5 miles or average 10 minute driving distance from the user's future scheduled event.

The schedule overlap module 930 can also use a proportion, such as 10% or one quarter, of the distance between two adjacent calendar events in the schedule calendar 502 of the user. For example, if the user has to travel 100 miles from calendar event X to the next occurring calendar event Y, the schedule overlap module 930 can use 10% or 10 miles for identifying the future contact opportunity 416.

The schedule overlap module 930 can similarly use adjacent calendar events to determine the predetermined time for identifying the future contact opportunity 416. For example, if the user has 2 hours between calendar event X and the next occurring calendar event Y, the schedule overlap module 930 can use one quarter or 30 minutes for identifying the future contact opportunity 416.

The schedule overlap module 930 can combine the time and distance considerations to identify the future contact opportunity 416. For example, if the user is scheduled for a lunch appoint within 5 miles and ending 15 minutes before the hairdresser appointment of the matching target 216, the hairdresser appointment can be identified as the future contact opportunity 416. Also, for example, if the user and the matching target 216 are both scheduled to attend the same event occurring at a future time, the event 204 that is common can be the future contact opportunity 416.

The schedule overlap module 930 can use the first control unit 712, the second control unit 734, the first storage unit 714, the second storage unit 746, the location unit 720, or a combination thereof to identify the future contact opportunity 416. The contact recorder module 928 can display the future contact opportunity 416 using the first control unit 712, the second control unit 734, the first display interface 730, the second display interface 740, or a combination thereof.

For illustrative purposes the location based system 100 is described as identifying the event participant 210 first then identifying the matching target. However, it is understood that the location based system 100 can operated differently and that each of the modules can operate individually and independently of the other modules.

For example, the filter module 822 of FIG. 8 can identify each person or entity within the geofence 212, if the search time window 214 includes or is equivalent to the current time, the filter module 822. The filter module 822 can then search for the event 204 describing each person or entity within the geofence 212. The person or entity having the event 204, the event participant 210, can be identified as the matching target 216. Also, for example, the participant location module 820 can identify the current location of the event participant 210 instead of the filter module 822.

The location based system 100 can be partitioned between the first device 102 of FIG. 7 and the second device 106 of FIG. 7. For example, the location based system 100 can be partition into the functional units of the first device 102, the second device 106, or a combination thereof The participant location module 820 and the locator module can be on the first device 102 and the filter module 822 can be on the second device 106.

The location based system 100 can also be implemented as additional functional units in the first device 102, the second device 106, or a combination thereof For example, the interaction module 810 can be additional functional unit in the first device 102 and the search module 808 of FIG. 8 can be additional functional unit in the second device 106.

The physical transformation of the event 204, such as a change in meeting time or location, results in movement in the physical world, such as in identifying or locating the matching target 216, based on the operation of the location based system 100. The movement of people in the real world can be fed back to the location based system 100 to further operate the location based system 100 to locate relevant contacts. For example, if the event location 206 or the event time 208 changes, the event participant 210 associated with the event 204 can change, thus changing the identity or location of the matching target 216.

It has been discovered that the present invention provides the location based system 100 with contextual locator for improving the efficiency and convenience for finding relevant person, entity, or thing associated with the event 204. The filter module 822 and the locator module 824 of FIG. 8 gives rise to the improvement in efficiency and convenience by identifying the matching target 216 as the event participant 210 located within the geofence 212 during the search time window 214.

Thus, it has been discovered that the location based system with contextual locator of the present invention furnishes important and heretofore unknown and unavailable solutions, capabilities, and functional aspects for locating relevant contacts.

Figure 10:
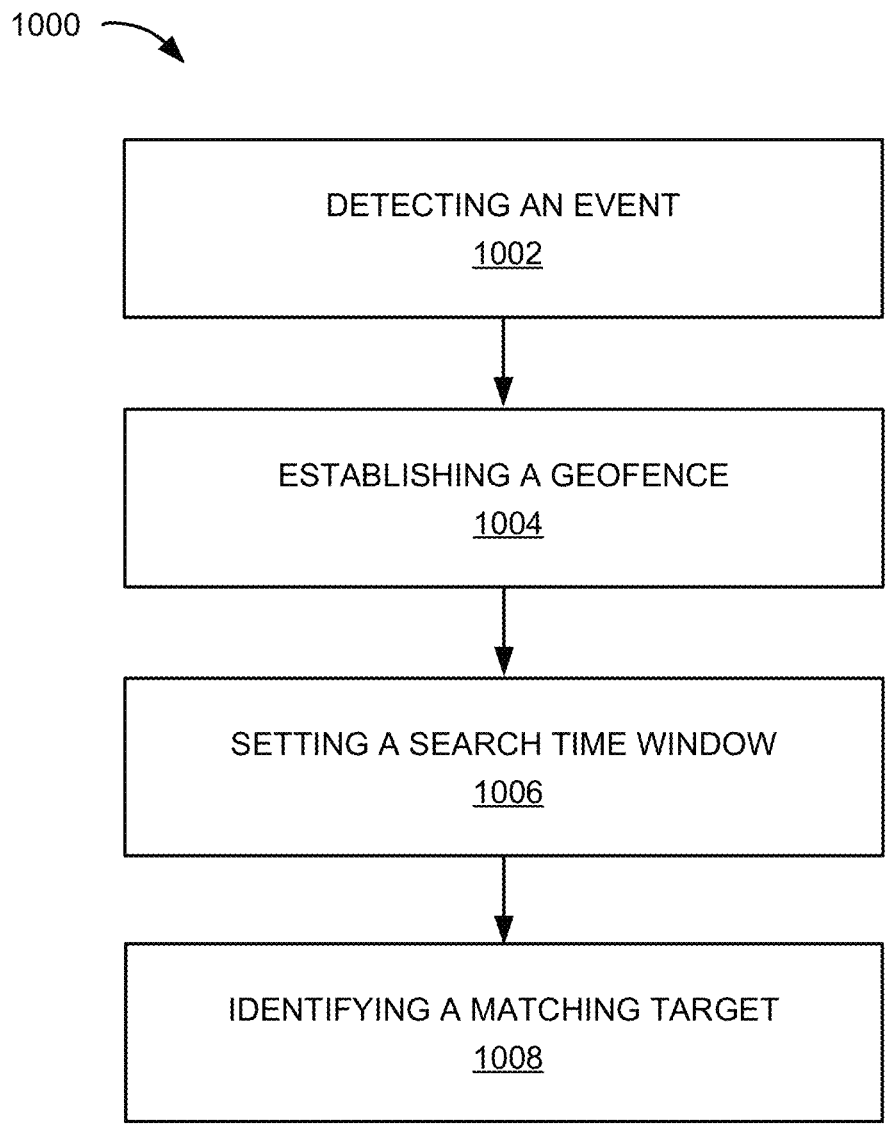
FIG. 10 is a flow chart of a method of operation of the location based system in a further embodiment of the present invention.

Referring now to FIG. 10, therein is shown a flow chart of a method 1000 of operation of the location based system 100 in a further embodiment of the present invention. The method 1000 includes: detecting an event representing a gathering of event participants in a block 1002; establishing a geofence associated with the event in a block 1004; setting a search time window associated with the event in a block 1006; and identifying a matching target from the event participants located within the geofence during the search time window for displaying on a device in a block 1008.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a location based wireless system comprising:
   identifying a search item;
   detecting an event representing a gathering of event participants;
   establishing a geofence associated with the event;
   setting a search time window associated with the event; and
   identifying a matching target based on the search item from the event participants located within the geofence during the search time window for displaying on a device.

2. The method as claimed in claim 1 wherein identifying the matching target includes identifying the matching target scheduled to be located within the geofence during the search time window.

3. The method as claimed in claim 1 further comprising:
   accessing a participant profile; and
   wherein identifying the matching target includes:
      identifying the matching target having the search item in the participant profile.

4. The method as claimed in claim 1 further comprising:
   establishing a close contact boundary during the event; and
   detecting a contact event, having a contact time and a contact location, when one or more of the event participants is located within the close contact boundary during the event.

5. The method as claimed in claim 1 further comprising:
   logging a communication profile, having a communication time, a communication location, a communication type, and a participant communication location with the communication profile associated with one or more of the event participants; and
   displaying a previous-communication reminder based on matching the communication profile and the matching target.

6. A method of operation of a location wireless based system comprising:
   identifying a search item;
   detecting an event representing a gathering of event participants;
   detecting an event location of the event and an event time of the event;
   establishing a geofence associated with the event;
   setting a search time window associated with the event;
   identifying a matching target based on the search item from the event participants located within the geofence during the search time window; and
   identifying a present target location of the matching target for displaying on a device.

7. The method as claimed in claim 6 further comprising:
   identifying a future target location, where the matching target is scheduled to be at a time occurring in the future; and
   identifying a future contact opportunity, having an opportune location and an opportune time, based on matching the future target location and a calendar event.

8. The method as claimed in claim 6 further comprising:
   calculating an ingress travel route from the present target location to a device location; and
   sending the ingress travel route to the matching target.

9. The method as claimed in claim 6 further comprising:
   setting a past time period for identifying the matching target previously within the geofence within the past time period;
   identifying a participant prior location for locating one or more of the event participants at a time occurring in the past; and
   wherein identifying the matching target includes:
      comparing the participant prior location identified within the time not exceeding the past time period.

10. The method as claimed in claim 6 further comprising:
    setting a future time period for identifying the matching target scheduled to be arriving in the geofence within the future time period;
    identifying a participant future location for locating one or more of the event participants at a time occurring in the future; and
    wherein identifying the matching target includes:
       comparing the participant future location identified within the time not exceeding the future time period.

11. A location based wireless system comprising:
    an event context module for detecting an event representing a gathering of event participants;

a search item module, coupled to the event context module, for identifying a search item;

a geofence module, coupled to the event context module, for establishing a geofence associated with the event;

a context time module, coupled to the event context module, for setting a search time window associated with the event; and a filter module, coupled to the geofence module, for identifying a matching target based on the search item from the event participants located within the geofence during the search time window for displaying on a device.

12. The system as claimed in claim 11 wherein the filter module is for identifying the matching target scheduled to be located within the geofence during the search time window.

13. The system as claimed in claim 11 further comprising:
a profile access module, coupled to the filter module, for accessing a participant profile; and
wherein:
the filter module is for identifying the matching target having the search item in the participant profile.

14. The system as claimed in claim 11 further comprising:
a close contact module, coupled to the event context module, for establishing a close contact boundary; and
a contact recognition module, coupled to the close contact module, for detecting a contact event, having a contact time and a contact location, when one or more of the event participants is located within the close contact boundary during the event.

15. The system as claimed in claim 11 further comprising:
a communication logging module, coupled to the filter module, for logging a communication profile, having a communication time, a communication location, a communication type, and a participant communication location with the communication profile associated with one or more of the event participants; and
a communication reminder module, coupled to the filter module, for displaying a previous-communication reminder, based on matching the event participants of the communication profile and the matching target.

16. The system as claimed in claim 11 further comprising a locator module, coupled to the filter module, for identifying a present target location of the matching target for displaying on a device.

17. The system as claimed in claim 16 further comprising:
a future location module, coupled to the filter module, for identifying a future target location, where the matching target is scheduled to be at a time occurring in the future; and
a schedule overlap module, coupled to the future location module, for identifying a future contact opportunity, having an opportune location and an opportune time, based on matching the future target location and a calendar event.

18. The system as claimed in claim 16 further comprising:
a route calculation module, coupled to the locator module, for calculating an ingress travel route from the present target location to a device location; and
an outgoing message module, coupled to the route calculation module, for sending the ingress travel route to the matching target.

19. The system as claimed in claim 16 further comprising:
a past buffer module, coupled to the context time module, for setting a past time period for identifying the matching target previously within the geofence within the past time period;
a participant location module, coupled to the filter module, for identifying a participant prior location for identifying a location of one or more of the event participants at a time occurring in the past; and
wherein:
the filter module is for identifying the matching target based on comparing the participant prior location identified within the time not exceeding the past time period.

20. The system as claimed in claim 16 further comprising:
a future buffer module, coupled to the context time module, for setting a future time period for identifying the matching target scheduled to be arriving in the geofence within the future time period;
a participant location module, coupled to the filter module, for identifying a participant future location for locating one or more of the event participants at a time occurring in the future; and
wherein:
the filter module is for identifying the matching target based on comparing the participant future location identified within the time not exceeding the future time period.

* * * * *